(12) United States Patent
Turner et al.

(10) Patent No.: US 12,535,333 B2
(45) Date of Patent: Jan. 27, 2026

(54) METHODS AND SYSTEMS FOR DELIVERY ROUTE OPTIMIZATION

(71) Applicant: United States Postal Service, Washington, DC (US)

(72) Inventors: Alison Frankowski Turner, Arlington, VA (US); Marc D. McCrery, Arlington, VA (US); James J. Boldt, Leesburg, VA (US)

(73) Assignee: United States Postal Service

( * ) Notice: Subject to any disclaimer, the term of this patent is extended or adjusted under 35 U.S.C. 154(b) by 51 days.

(21) Appl. No.: 17/663,950

(22) Filed: May 18, 2022

(65) Prior Publication Data

US 2022/0373352 A1    Nov. 24, 2022

Related U.S. Application Data

(60) Provisional application No. 63/190,065, filed on May 18, 2021.

(51) Int. Cl.
*G01C 21/36* (2006.01)
*G01C 21/34* (2006.01)

(52) U.S. Cl.
CPC ..... *G01C 21/3697* (2013.01); *G01C 21/3446* (2013.01); *G01C 21/3461* (2013.01); *G01C 21/3492* (2013.01); *G01C 21/367* (2013.01)

(58) Field of Classification Search
CPC .................................................. G01C 21/3697
See application file for complete search history.

(56) References Cited

U.S. PATENT DOCUMENTS

| | | | | |
|---|---|---|---|---|
| 7,385,529 | B2 * | 6/2008 | Hersh | G06Q 10/1097 |
| | | | | 705/28 |
| 9,086,292 | B2 * | 7/2015 | Horvitz | G01C 21/3697 |
| 9,639,412 | B1 * | 5/2017 | Levy | H04L 43/04 |
| 9,928,475 | B2 | 3/2018 | Burnett | |
| 11,808,589 | B1 | 11/2023 | Dong | |
| 2003/0036938 | A1 | 2/2003 | Dutta et al. | |
| 2006/0167734 | A1 | 7/2006 | Scott et al. | |
| 2013/0297095 | A1 | 11/2013 | Kwak | |
| 2013/0297524 | A1 * | 11/2013 | Lau | H04W 4/029 |
| | | | | 705/333 |

(Continued)

FOREIGN PATENT DOCUMENTS

WO    WO 2000-016293 A1    3/2000

OTHER PUBLICATIONS

Timpner, Julian et al., Query-response geocast for vehicular crowd sensing, Science Direct, Ad Hoc Networks vol. 36, Part 2, Jan. 2016, pp. 435-449 (https://www.sciencedirect.com/science/article/pii/S1570870515001286) (hereinafter "Timpner") ( Year: 2016).*

(Continued)

*Primary Examiner* — Jean Paul Cass
(74) *Attorney, Agent, or Firm* — Knobbe, Martens, Olson & Bear, LLP

(57) ABSTRACT

System and methods described herein relate to a driving speed matrix and a traffic control point matrix based on breadcrumb data. Standardized routes and times can be determined based on the breadcrumb data, and the standardized routes and times can be mapped onto a plurality of routes. Based on standardized times for routes, routes can be adjusted or optimized.

16 Claims, 9 Drawing Sheets

(56) References Cited

U.S. PATENT DOCUMENTS

| | | |
|---|---|---|
| 2014/0040166 A1 | 2/2014 | Handley |
| 2014/0278070 A1 | 9/2014 | McGavran et al. |
| 2014/0343839 A1 | 11/2014 | Lin et al. |
| 2015/0177011 A1 | 6/2015 | Ibrahimi et al. |
| 2016/0189526 A1 | 6/2016 | Kennedy et al. |
| 2017/0053234 A1* | 2/2017 | Lozito ................ G06Q 10/0833 |
| 2017/0262790 A1 | 9/2017 | Khasis |
| 2018/0174446 A1* | 6/2018 | Wang ............... G08G 1/096716 |
| 2019/0063939 A1* | 2/2019 | Chai ....................... G06F 16/29 |
| 2019/0102960 A1* | 4/2019 | Thibault ................ B60W 40/08 |
| 2019/0108479 A1 | 4/2019 | Dearing |
| 2019/0178672 A1* | 6/2019 | Woolley ............. G01C 21/3415 |
| 2019/0178679 A1* | 6/2019 | Woolley ............. G01C 21/3655 |
| 2020/0097908 A1 | 3/2020 | Glasfurd |
| 2020/0200553 A1* | 6/2020 | Voznesensky ........ B60W 40/06 |
| 2020/0334637 A1* | 10/2020 | Turner ............. G06Q 10/08355 |
| 2020/0400439 A1* | 12/2020 | Thompson ......... G01C 21/3697 |
| 2020/0400441 A1* | 12/2020 | Efland .................. G01C 21/387 |
| 2021/0182757 A1* | 6/2021 | Kaneichi .......... G06Q 10/06315 |
| 2021/0182787 A1* | 6/2021 | Mouli ............... G06Q 10/0838 |
| 2022/0013014 A1* | 1/2022 | Xu ..................... G01C 21/3691 |
| 2022/0036284 A1 | 2/2022 | Oyama |
| 2022/0083925 A1 | 3/2022 | Varadarajan et al. |
| 2022/0157167 A1* | 5/2022 | Gupta ................ G01C 21/3446 |
| 2022/0341747 A1* | 10/2022 | Levin ................. G01C 21/3632 |
| 2022/0373352 A1* | 11/2022 | Turner ............... G01C 21/3461 |
| 2022/0404162 A1* | 12/2022 | Williams ......... G08G 1/096716 |
| 2024/0193535 A1 | 6/2024 | Turner et al. |

OTHER PUBLICATIONS

Marco, Diana et al., Freight distribution in urban areas: a method to select the most important loading and unloading areas and a survey tool to investigate related demand patterns, Springer Open, European Transport Research review, (https://etrr.springeropen.com/articles/10.1186/s12544-020-00430-w) (Year: 2020).*

Mbiydzenyuy, G. et al. "Road travel time prediction—A micro-level sampling approach," 16th International IEEE Conference on IntelligentTransportation Systems (ITSC 2013), The Hague, Netherlands, 2013, pp. 1613-1618, doi: 10.1109/ITSC.2013.6728460. (Year: 2013).

Abbatecola, et al. "A review of new approaches for Dynamic Vehicle Routing Problem," 2016 IEEEInternational Conference on Automation Science and Engineering (CASE), Fort Worth, TX, USA, 2016, pp. 361-366, doi: 10.1109/COASE.2016.7743429. (Year: 2016).

* cited by examiner

METHODS AND SYSTEMS FOR DELIVERY ROUTE OPTIMIZATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of U.S. Provisional Application No. 63/190,065 filed on May 18, 2021 in the U.S. Patent and Trademark Office, the entire contents of which are incorporated herein by reference.

FIELD

This disclosure relates to using data received from entities servicing a particular route to generate a representation for that route, and in particular, to dynamically generate the representation of the route and an expected time required to travel the route and provide requisite services to stops along the route.

BACKGROUND

Delivery systems/services and corresponding routes are becoming more common. As more service providers offer such delivery services, identifying and improving on efficiencies of the delivery routes is critical to reduce costs and maintain services. Systems and methods described herein relate to improving efficiency of routing and identifying and correcting routing problems or inefficiencies.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include data authentication services.

In one aspect described herein, a method of generating a digital representation of a delivery route, the method comprises receiving, via a user interface, a request to generate the digital representation of the delivery route; receiving, by a processor, location data for a delivery resource that travels the delivery route, the location data comprising global positioning system (GPS) breadcrumb data received from a mobile computing device while the delivery resource traverses the delivery route; identifying, by a processor, stops along the delivery route in the location data; determining, by a processor, whether the identified stops comprise delivery points or traffic control points along the delivery route; generating the digital representation of the delivery route based on the identified stops and the GPS breadcrumb data; identifying one or more features of the delivery route, wherein each of the one or more features of the delivery route comprises one or more corresponding characteristics associated therewith; categorizing the one or more features of the delivery route into one or more categories based on the characteristics of the one or more features, wherein each category of the one or more categories has a particular combination of characteristics and a corresponding time period associated therewith; and determining a duration of the delivery route based on the corresponding time periods associated with each of the one or more categories for the one or more features of the delivery route.

In some embodiments, identifying stops along the delivery route comprises determining that a stop exists at a particular location based on a quantity of breadcrumb data at or within a threshold distance of the particular location.

In some embodiments, identifying stops along the delivery route comprises determining that a stop exists at a particular location based on identification of the stop by the carrier via a user interface.

In some embodiments, identifying one or more features of the delivery route comprises analyzing the breadcrumb data with one or more algorithms to identify delivery point stops along the delivery route.

In some embodiments, the one or more corresponding characteristics comprise a duration of travel between pairs of consecutive delivery point stops, distance traveled between the pairs of consecutive delivery point stops, and an average speed of the delivery vehicle when traveling between the pairs of consecutive delivery point stops.

In some embodiments, identifying one or more features of the delivery route comprises receiving identification of delivery points from the delivery resource via a user interface.

In some embodiments, identifying one or more features of the delivery route comprises analyzing the breadcrumb data with one or more algorithms to identify traffic control points along the delivery route.

In some embodiments, identifying one or more features of the delivery route comprises receiving identification of traffic control points from the carrier via a user interface.

In some embodiments, the method further comprises determining a standard time for each of the categories based on historical breadcrumb data from a plurality of delivery resources and a plurality of routes for a predetermined time.

In some embodiments, identifying the one or more features of the delivery route further comprises identifying segments of the routes which occur between the identified stops.

In another aspect described herein, a system of managing delivery routes comprises via a user interface configured to generate a request for a digital representation of the delivery route; a location circuit configured to generate breadcrumb data as a delivery resource traverses a delivery route; a processor configured to: receive, from the location circuit, the breadcrumb data from the delivery resource; identify a plurality of stops in the breadcrumb data; determine whether each of the plurality of identified stops comprises a delivery points or a traffic control point; generate the digital representation of the delivery route based on the identified stops and the breadcrumb data; identify one or more features of the delivery route, wherein each of the one or more features of the delivery route comprises one or more corresponding characteristics associated therewith; categorize the one or more features of the delivery route into one or more categories based on the characteristics of the one or more features, wherein each category of the one or more categories has a particular combination of characteristics and a corresponding time period associated therewith; and determine a duration of the delivery route based on the corresponding time periods associated with each of the one or more categories for the one or more features of the delivery route.

In some embodiments, the processor is further configured to determine that a stop exists at a particular location based on a quantity of breadcrumb data at or within a threshold distance of the particular location.

In some embodiments, the processor is configured to identify stops along the delivery route by determining that a stop exists at a particular location based on identification of the stop by the carrier via a user interface.

In some embodiments, the processor is configured to identify the one or more features of the delivery route by analyzing the breadcrumb data with one or more algorithms to identify delivery point stops along the delivery route.

In some embodiments, the one or more corresponding characteristics comprise a duration of travel between pairs of consecutive delivery point stops, distance traveled between the pairs of consecutive delivery point stops, and an average speed of the delivery vehicle when traveling between the pairs of consecutive delivery point stops.

In some embodiments, identifying one or more features of the delivery route comprises receiving identification of delivery points from the delivery resource via a user interface.

In some embodiments, the processor is configured to identify the one or more features of the delivery route by analyzing the breadcrumb data with one or more algorithms to identify traffic control points along the delivery route.

In some embodiments, the processor is further configured to identify one or more features of the delivery route by receiving identification of traffic control points from the carrier via a user interface.

In some embodiments, the processor is further configured to determine a standard time for each of the categories based on historical breadcrumb data from a plurality of delivery resources and a plurality of routes for a predetermined time.

In some embodiments, the processor is further configured to identify the one or more features of the delivery route comprises identifying segments of the routes which occur between the identified stops.

BRIEF DESCRIPTION OF THE DRAWINGS

These drawings and the associated descriptions herein are provided to illustrate specific embodiments of the invention and are not intended to be limiting.

DETAILED DESCRIPTION

Figure 1:
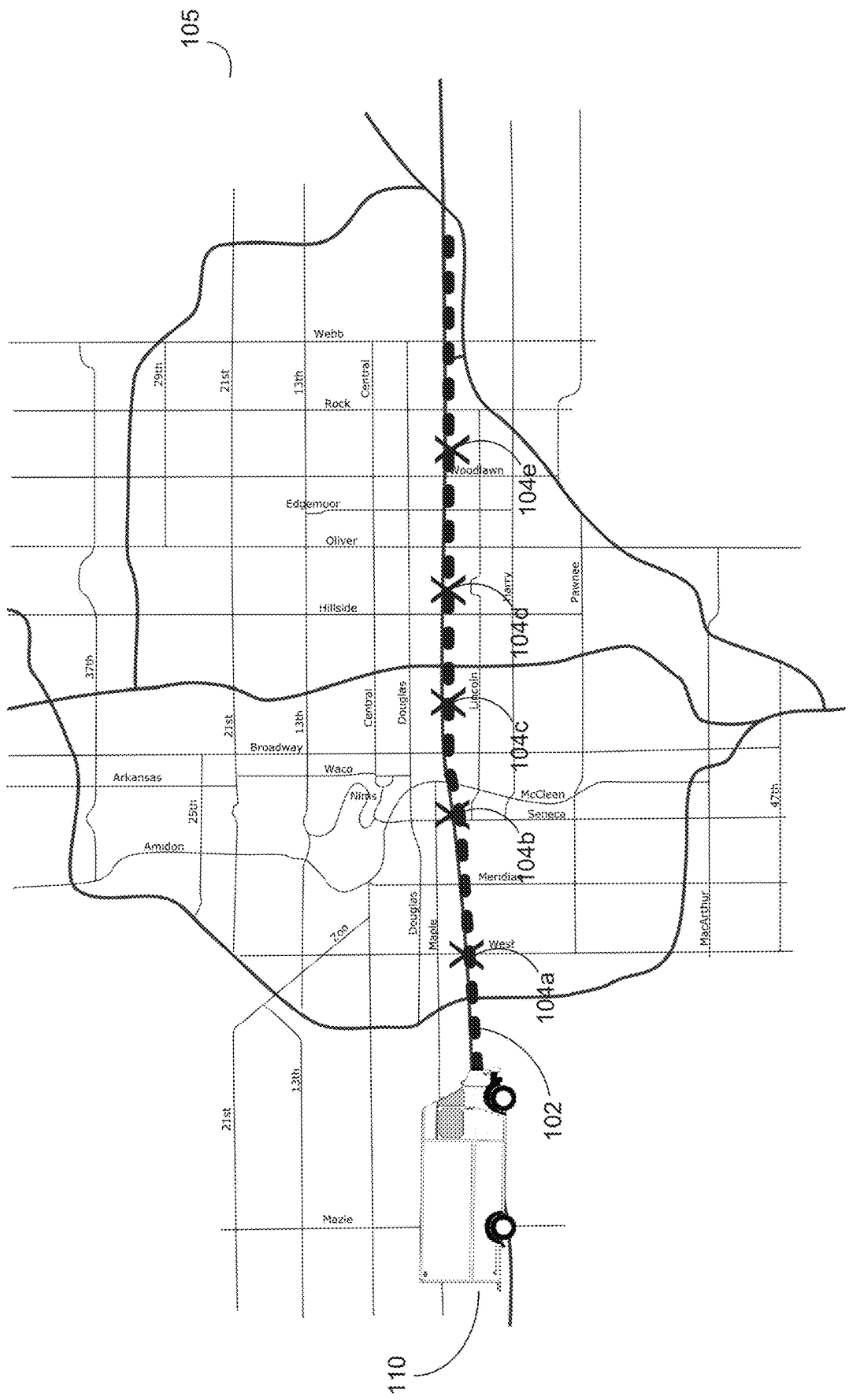
FIG. 1 is an overview diagram of a geographic region in which a localized delivery system is implemented.

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The present disclosure relates to systems and methods for generating representations for physical routes for delivery systems/services. In some embodiments, the systems and methods disclosed herein are configured to receive customer requests and, based on the customer requests and the carrier statuses, update routes and corresponding schedules of route carriers based on existing route information and the customer requests. In some embodiments, the systems and methods disclosed herein are configured to receive data from the carriers and use this data to augment and/or generate new routes to improve efficiencies in the delivery systems.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network.

Additionally, as used herein, the term "resident" may refer to any individual or entity that resides, works, visits, or is associated with an address. For example, as used herein, a person at his or her office is a resident, as is a student or teacher at a school. As used herein, a resident can be an entity capable of sending items from an address and receiving items at an address. Additionally, the term "residence" may refer to any building having an assigned physical address, such as a house, an office building, an apartment, a factory, a school, etc. As used herein, a residence can be any location capable of being a destination for items within the distribution network or being a return address for items in the distribution network.

For example, a distribution network, or an item delivery service such as the United States Postal Service (USPS), may deliver items (for example, mail), such as letters, flats, parcels, packages, bulky items, etc., according to static and/or dynamic routes. The United States Postal Service (USPS) will be used in the present disclosure to describe exemplary embodiments, but the present disclosure is not limited thereto. When referencing generically to any of the services listed above or any distribution network in addition to those listed above, the terms item delivery service or distribution network will be used to indicate such generalities. A static route can be a collection of plurality of stops or delivery points in a geographic area that is the same for every delivery period, such as for every day. A delivery resource can traverse a static route by traversing or travelling to the same collection of stops, in the same order, each day. A dynamic route can comprise a plurality of stops that are dynamically assigned each delivery period. Each delivery period the stops on the dynamic route are different, and the delivery resource travels a separate path to the different stops.

Part of identifying and improving efficiencies can involve generating digital representations of physical routes to enable evaluation and optimization of the routes based on identifying and correlating existing delivery routes with actual delivery point and tracking data. Furthermore, updating and/or creating new delivery routes based on demand or volume, for example, including on-demand requests, average use, results of optimization, etc., not available in existing systems and methods may be advantageous in maintaining and/or improving efficiencies. In some embodiments, carrier accuracy or efficiency can be evaluated by comparing a planned/scheduled route with the data from the actual traversing of the route, and comparing the actual to the model or planned/scheduled route.

In some embodiments, the delivery service may deliver and/or pickup items over a large geographic area that is divided into one or more delivery routes. In some embodiments, the route(s) may be generated based on address information only when reviewing the geographic area. Information for setting the routes may be incomplete or inaccurate. When a delivery resource, such as a carrier, traverses the route, information about the route, delivery points along the route, stops, traffic conditions, construction, hazards, and other information may become available. Accordingly, the routes may not account for variances or details that are particular to addresses or delivery points. For example, the route(s) may mistakenly view an apartment building as including only one actual delivery point or delivery stop, when, in actuality, there are many delivery points because each apartment actually has its own delivery point. As another example, the initial generated route may not account for traffic events or variances based on times of day. For example, the initial route may not account for speed limits in school zones that fluctuate based on time of day or high density traffic lights that are only active during high traffic periods, alternating lanes, construction, etc. In delivery systems that track efficiencies and/or grade carrier service based on how well the carrier's movements for the day track their corresponding routes, such "mistakes" or traffic occurrences can affect the carrier's efficiencies or grade because the route to which the carrier's movements are compared is incorrect. Accordingly, systems and methods configured to dynamically augment or modify existing and/or create new routes based on information from the carrier's movements are desired. As described herein, any particular geographic area may include multiple routes; however, for purposes of description herein, discussion is focused on a single exemplary route but applies equally to any and all item servicing and delivery routes.

In order to analyze existing routes and to optimize the existing routes for future servicing, delivery routes can advantageously be digitized. Routes may be digitized by receiving and analyzing breadcrumb data from mobile computing devices or vehicles, such as those used by, for example, mail carriers, as described in further details below. The breadcrumb data can be analyzed to identify activities, driving times, and so forth to generate a digital route that corresponds to the route traveled by the carrier. Various management tools can be applied to the breadcrumb data and/or the digital route to generate further information and/or details. Digitized routes can be used to analyze route travel and delivery resource efficiency on a given day for a given route.

The USPS delivers items, such as mail and packages, to every physical address in the United States on a daily basis, Monday through Saturday according to static and dynamic routes. Static routes are routes that are traversed every day by a delivery resource, with each delivery point in the same order such that the delivery resource visits or passes the same stops or addresses each day. A dynamic route is a route that may change from day to day based on volume, types of items, on-demand requests, emergencies, and the like. The USPS is tasked with providing secure, reliable, and affordable delivery of items to every address in the United States, U.S. territories, and U.S. military installations worldwide. For example, the USPS delivers more than 500 million items to over 160 million destinations (addresses) every day. In delivering these items to each of these addresses, in the United States and worldwide, the USPS may establish numerous routes for carriers to travel when distributing the mail.

A distribution network of may comprise multiple levels. For example, the distribution network may comprise regional distribution facilities, hubs, and unit delivery facilities, or any other desired level. For example, the (nationwide) distribution network may comprise one or more regional distribution facilities having a defined coverage area (such as a geographic area, for example a state or a metropolitan area), designated to receive items from intake facilities within the defined coverage area, or from other regional distribution facilities. The intake facility may function to be the location or facility where individual items are, for the first time in the distribution network, identified and entered into the tracking of the distribution network. The regional distribution facility can sort items for delivery to another regional distribution facility, or to a hub level facility within the regional distribution facility's coverage area. A regional distribution facility can have one or more hub level facilities within its defined coverage area. A hub level facility can be affiliated with a few or many unit delivery facilities, and can sort and deliver items to the unit delivery facilities with which it is associated. In some embodiments, the unit delivery facility may also serve as the intake facility. In the case of the USPS, the unit delivery facility may be associated with a ZIP code. The unit delivery facility can receive items from local senders, and from hub level facilities or regional distribution facilities. The unit delivery facility can also sort and stage the items intended for delivery to destinations within the unit delivery facility's coverage area. The routes may enable carriers to take mail items from unit delivery facilities and deliver the mail items to respective delivery points according to the routes, as described further below.

As described above, the distribution network employed may comprise numerous pieces of equipment located in various facilities that may automatically route items according to information indicated on the items, physical characteristics of the items, and/or postage characteristics. For example, a letter mailed from San Diego, CA, to Washington, D.C., with First Class postage may be routed differently than a large package mailed between the two locations. Similarly, a second letter mailed with Next Day postage may be routed differently than the letter mailed with First Class postage. The variety of potential routes for different types of items or different postage services indicates the benefit of distributing a system throughout the distribution network (for example in multiple intake and unit delivery facilities) to maximize the amount of information gathered by the system to associate with residences and addresses.

In some embodiments, the delivery system utilizes a base route structure to deliver mail to business and residential customers. The base may be a fixed set of addresses that are specified in an address management system (AMS). The AMS can store a coordinate for each delivery point in the distribution network. The coordinates can be latitude/longitude, or can be a different coordinate structure. Within a particular delivery unit of the delivery system, the carrier performs various activities (e.g., casing mail, sorting parcels and loading the delivery vehicle, otherwise designated as "office" activities) necessary to prepare the carrier's route's mail for delivery on a particular day. These "office" activities are similar in form each day but may require substantially different amounts of time because of day-to-day differences in mailstream volumes. Other carrier activities may be more directly associated with servicing the route, for example driving, servicing mailboxes and performing services at the delivery points, such as a customer's door (e.g., delivering large parcels) (otherwise designated as "street" activities). A line-of-travel for the carrier along a particular route, such as a static route, should be about the same each day; similarly, the time required for the route should be approximately the same each day if: 1) all customers on the route receive mail for the day; 2) there are no at-door services, or a similar number of at-door services, for the day; and 3) there are no "extreme" driving disruptions (e.g., detours, traffic, and so forth). However, variability in the quantity of at-door services, for example, parcel delivery, often causes both the street time and the line-of-travel to vary from day to day.

"Standard time" may be used to identify, for a delivery route, a time required by an experienced and motivated worker of normal skill and ability, working at a normal workday pace, to perform a specific task under specific conditions with allowance time to meet personal needs, overcome the fatiguing aspects of work, and compensate for unavoidable delays. As applied herein, this concept is critical both for designing good routes for carriers and for managing the carriers who service these routes. Without a reliable method for estimating the time required to service a route, there is no way to know if the route's required activities can all be performed within an acceptable workday. Also, since for the street portion of the route, a carrier is "out-of-sight" of any supervisor, and no two routes are the same, it is not possible to objectively evaluate the performance of a carrier without some concept of standard time.

In some instances, standard times are developed for the routes based on various processes, including defining a set of activities that include all work performed by the carrier on the route. Based on the activities, a standard time for the entire route can be calculated based on summing the standard times for each of the activities for that route multiplied by the number of times each activity is performed for that route.

In many instances, the systems and methods described herein represent an innovative and powerful foundation for a management tool set for managing the delivery system that provide various benefits over existing systems and analysis methodologies. For example, because of the complexities involved and an inability to implement constant management and/or observation of the delivery routes, the delivery routes are extremely difficult to optimally design and manage to full potential. Altogether, the carriers across a distribution network, such as the USPS, servicing the delivery routes perform millions of activities each day. Thus, even small changes in these activities can have a large impact to the delivery system, for example, changing costs by millions of dollars. The management toolset includes tools that enable identification and analysis of specific activities that have a threshold impact on the delivery route and the delivery system. Further, the management tool set enables identification of which elements of each activity can be improved to generate improvements in the delivery routes and the delivery system. The time standards may simplify calculation and determination of cost savings and/or productivity gains as compared to previously available analytical tools. These tools may apply the time standards to assess information related to the delivery route activities, which can further be analyzed to monitor various aspects of delivery services and/or other products provided by the delivery system and to enable dynamic adjustment of routes to maintain substantial balance for the routes. Thus, these management tools enable dynamic management of delivery routes to changing circumstances and better predict route performance.

The standards described herein may enable the delivery system to determine and/or calculate values for all routes of the delivery system with generic and/or generalized algorithms, etc., while identifying travel and/or service times for the corresponding route. As described below, the service times for digital routes for all of the routes of the delivery system may be estimated using these algorithms and tools based on aggregating times taken to perform the various activities that make up the route.

In some embodiments, the delivery system may use a standard route time to define the base hours used as the basis for carrier pay for carriers that service one or more routes. Each carrier is responsible for performing all required activities on his/her defined route. When these required activities are completed, the carrier's workday for the delivery service is complete, regardless of the actual time required to complete the activities. This use of delivery route standards requires sufficient precision for a determination that the standard route time is fair to both the delivery network and the carriers. If the standard route time is fair, this concept for managing delivery networks has significant advantages for both parties. The delivery system is assured of getting a fair amount of work for a fair amount of pay with very little management required. The carriers are enabled to work at their own pace and to get the benefit of working "smarter and/or faster" by being allowed to end their workday when the defined activities have been completed. The primary challenge is to have rigorous engineering processes and systems that generate fair standards and keeps them fair in a changing environment. A secondary challenge is to maintain sufficient rigor and transparency of these processes to continuously assure both parties that the standards are indeed fair.

The carriers that work the various routes for the USPS (or other delivery system) may utilize various equipment that the delivery system may use to track movements, etc., of the carrier. For example, each carrier may utilize a single mobile delivery device (MDD) that provides various data, including global positioning system (GPS) "breadcrumb" data and scan data of various information from scanned items being delivered and/or picked up. Additional GPS breadcrumb data may be received from the delivery vehicle used by the carrier such that the delivery system receives two separate sets of GPS data from different equipment while the delivery route is being traveled. Such breadcrumbs and scan information provide a wealth of information relating to delivery activities. Once the breadcrumbs and scan data are processed by various algorithms, this MDD (and delivery vehicle) data can be used to provide travel and cost information useful to augmenting routes within the delivery system. In some embodiments, such augmenting of routes may be automatic/dynamic and may result in time and cost optimized routes, especially in rural areas where deliveries many be less common. However, such augmenting of routes is applicable in all locales and routes.

In some embodiments, one or more algorithms process received GPS breadcrumbs to create and digital routes and corresponding information regarding physical characteristics of the digital routes. More specifically, the algorithms may identify where stops are located and when the carrier is expected to arrive at that stop each day. In some instances, carrier feedback may enable identification of delivery route characteristics (for example, traffic control points, delivery points (i.e., stops), distances, and the like). Analysis of the GPS breadcrumb data to identify time standards may utilize the GPS breadcrumb data to generate drive speed and traffic control point standards. Furthermore, though not described herein in detail, the breadcrumbs may be analyzed to identify stops along the route and classify or identify a kind of stop based on the breadcrumb data. More details regarding these standards are provided below.

FIG. 1 is an overview diagram of a geographic region 105 in which a localized delivery system (not shown) is implemented. The delivery system, described with further reference to FIG. 2, may comprise or utilize an automated system, a software interface, or a live attendant, for example. The delivery system includes or utilizes a delivery vehicle 110 traveling across the geographic region 105. At any particular time, a first delivery vehicle 110 may be located along a first route 102. One or more other delivery vehicles (not shown) may travel across the geographic region 105 along another route. In some embodiments, the delivery vehicle 110 may be part of one or more transportation services and may travel according to one or more delivery routes that are static and predetermined or dynamic and variable.

The route 102 may comprise one or more stops 104a-104e within the geographic region. The delivery vehicle 110 may travel along the route 102 and stop at the one or more stops 104a-104e to pick up or drop off one or more items. In some embodiments, the stops are at businesses, residences, or other standalone mailbox locations. Accordingly, the stops may be located in close proximity to each other or with large distances between one or more of the stops. Though the route 102 as shown is generally straight, the route 102 may include any number of turns, stops, etc.

In some embodiments, the stops 104 shown on the route 102 correspond to dynamic or static stops. The dynamic stop is a stop that is dynamically added or removed from the route 102 while the delivery vehicle 110 is traveling along the route 102. For example, while the delivery vehicle 110 is traveling along the route 102, a customer may contact the delivery system operating in the geographic region 105 to request or coordinate a pickup and/or delivery of an item or good. The static stop is a stop that is not added or removed from the route 102 while the delivery vehicle 110 is travelling along the route 102.

The delivery system 100 may digitize a route to then be able to optimize the route based on various analysis techniques. For example, the delivery system uses the route 102 to estimate an expected amount of time for travel along the route 102 and servicing of the stops 104a-104e and use this estimated time as a baseline for improvements. However, generating this estimated time may be difficult and time or resource intensive.

The delivery system may include one or more components that utilize information from the delivery vehicle 110 and/or the driver of the delivery vehicle 110 to generate and/or update the route 102 along which the delivery vehicle 110 travels to pick up and distribute items.

The disclosed methods and systems can be used on a local level, such as depicted in FIG. 1, and can be used on a city or town level, a county level, a state level, a regional level, a national level, or with any desired geographic area.

Figure 2:
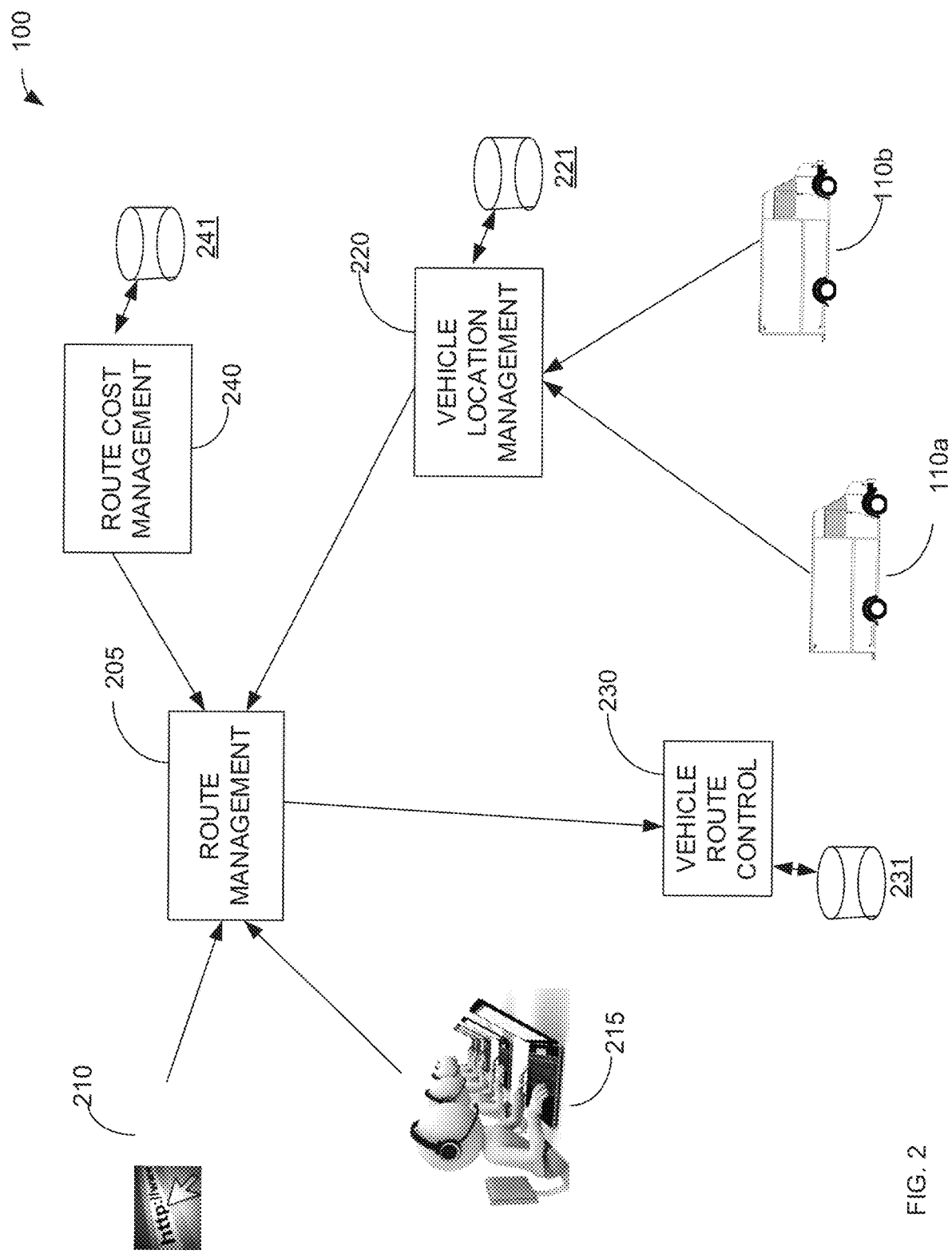
FIG. 2 is an exemplary block diagram of the localized delivery system.

FIG. 2 is an exemplary block diagram of a portion of the delivery system 100. The delivery system 100 includes a route management component 205, a vehicle location management component 220, a vehicle location database 221, a vehicle route control component 230, a vehicle route database 231, a cost management component 240, and a route cost database 241. Each of the route management component 205, the vehicle location management component 220, the vehicle route control component 230, and the route cost management component 240 comprises one or more of a networked computer system, a server, or similar system configured to receive information from one or more sources, including customers, delivery vehicles 110, etc., and process the received information electronically. In some aspects, the information received from customers may be received via a computer portal or interface 210, such as a website, an internet-enabled computing device, a software application, a smartphone, or the like. In some aspects, the information received from customers may be received from electronically from a call center 215, with the customer calling into the call center 215 or showing up in person to communicate a request, where the request comprises a change in a route (i.e., an added stop) for one of the delivery vehicles 110 associated with the delivery system 100.

In some aspects, the route management component 205 receives location information, such as Global Positioning System ("GPS") information and/or time information, from the delivery vehicle(s) 110 via the location management component 220. For example, the delivery vehicle 110 includes two GPS devices, one of which is considered part of the delivery vehicle 110 (e.g., the first GPS device 505, shown in FIG. 5) and the other being considered part of the driver or operator (also referred to herein as the carrier) (e.g., the second GPS device 510, shown in FIG. 5). In some embodiments, the location management component 220 receives GPS information from the two GPS devices at or of the delivery vehicle(s) 110 via one or more communication systems. The location management component 220 also preprocesses the received GPS information and appends time information to the received GPS information as needed if the received GPS information does not already include time information. In some embodiments, the location management component 220 may perform one or more of the processes described herein by implementing one or more of the described algorithms. In some embodiments, the vehicle location management component 220 may store information (for example, received GPS information, etc.) in a vehicle location database 221.

In some aspects, the route management component 205 uses the GPS information received from the vehicle location management 220 (and/or any information determined from an analysis of the GPS information) to track delivery vehicles 110 and manage routes 102 of the delivery vehicles 110. Accordingly, the route management component 205 uses the vehicle route control component 230 to create new routes 102 and/or update existing routes. For example, via the route management component 205, the delivery system may track and/or monitor all routes 102 associated with the delivery system and its delivery vehicles 110. In some embodiments, the various information regarding the routes 102 is stored in the route database 231.

The route cost management component 240 may determine and/or track costs of the routes 102. Cost components of the routes 102 may be used to evaluate the routes, for example, to determine how to adjust them to make them more efficient and/or cost effective. Details of the route cost may be saved in the cost database 241. In some instances, the route cost management component 240 may also identify characteristics of routes, such as times for the routes, stops for the routes, and the like.

In some embodiments, the delivery system 100 may work to make its routes 102 more efficient. For example, the delivery system may monitor efficiencies of existing routes 102, monitor efficiencies of delivery vehicles 110 and carriers on their routes 102, and determine how to improve existing routes 102, combine existing routes 102, and generate new routes 102. In some embodiments, such changes and/or improvements may be made based on an analysis of information regarding the routes 102 and based on GPS information received from delivery vehicles 110 traveling along their routes.

Details of how the GPS information from the GPS devices of the delivery vehicle 110 can be used in conjunction with existing routes 102 are described below. As noted above, GPS information (such as GPS readings) may be received from the GPS devices of the delivery vehicle 110. Details of how the delivery system 100 (and its various components and modules) use GPS data in conjunction with existing routes are provided below. The delivery system 100 may perform any or all of the processing, analysis, algorithm application, and so forth described below. In some embodiments, the delivery system 100 comprises a computing device (for example, described below with reference to FIG. 6) to perform any processing, analysis, etc., described herein. In some embodiments, one or more of the components of the delivery system 100 comprises a computing device (for example, described below with reference to FIG. 6) to perform any processing, analysis, etc., described herein.

Estimate Vehicle Stops

As generally known, GPS information may be used to determine a position for a vehicle when the GPS device is included in the vehicle. Similarly, GPS information can be used to determine the position of the delivery vehicle 110. However, GPS readings from the GPS devices at the delivery vehicle 110 may continue to show movement even when the delivery vehicle 110 itself is stationary. This, as noted above, may be due to the jitter received in GPS readings.

When the delivery vehicle 110 is stopped, the speed of the delivery vehicle 110 as determined based on the GPS readings may be reported to be very small or null (depending on the GPS devices and the GPS logging software). Similarly, while the delivery vehicle 110 is stopped, the heading of the delivery vehicle 110 (as based on the GPS readings) may also be reported as null or being very small. In some embodiments, the speed and the heading may vary considerably.

Thus, to identify stops of the delivery vehicle 110, the GPS readings from the delivery vehicle 110 may be analyzed according to the following sequence. First, the stream of GPS readings from the delivery vehicle 110 is analyzed to identify a subset of sequential GPS readings during which the velocity of the delivery vehicle 110 is indicated as being sufficiently small. The "sufficiently small" velocity may be selectively established as needed dependent upon an accuracy or precision required in the stop determination and the frequency of readings from the GPS devices of the delivery vehicle 110. For example, a reasonable "sufficiently small" value is 1.5 meters/second. For GPS devices of the delivery vehicle 110 that record GPS readings at a very high frequency, the desired subsequence should extend for at least a half-second, or some length of time that is slightly less than the length of the shortest imaginable stop, considering that the driver of the delivery vehicle 110 presumably must move his or her foot from the brake to the accelerator.

Additionally, subsequences of GPS readings indicating the sufficiently small velocity may be interpreted as stops of the delivery vehicle 110. Even though the speed of the subsequences may be reported to be very small or null, the GPS readings will have different latitudes and longitudes. Thus, for each such subsequence of GPS readings, a stop can be determined based on the average latitude, longitude, and heading of the subsequence of GPS readings having the sufficiently small velocity. For the determined stop, a time of arrival is interpreted to be the time of the earliest GPS reading in the subsequence minus one-half the standard time between GPS readings and the time of departure from the determined stop is the time of the latest GPS reading in the subsequence plus one-half the standard time between GPS readings.

Furthermore, stops that are sufficiently close in time or physical space, when reviewed or analyzed in chronological order, may be combined into a single stop. For example, if two presumed stops are separated by no more than 2 seconds or less than a couple feet, the two stops may be determined to represent a single, longer stop that begins with the arrival time of the first stop and ends with the departure time of the second stop. For these "combined" stops, the location, speed, and heading of the "combined" stop are each computed as weighted averages of the location, speed, and heading, respectively, of the contributing stops, with the weights being proportional to the respective durations. Finally, stops that are implausibly short (for example, less than 1 second) are filtered out.

Figure 3:
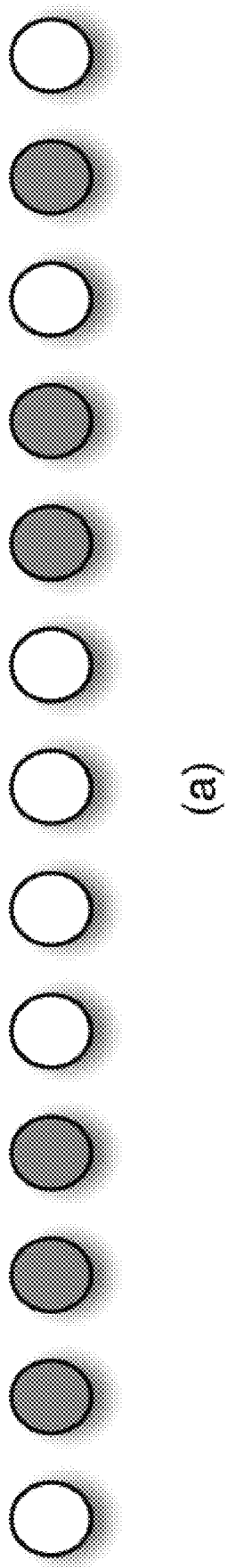
FIG. 3 is a diagram depicting an example of determining stops based on parameters of GPS readings.
Figure 3:
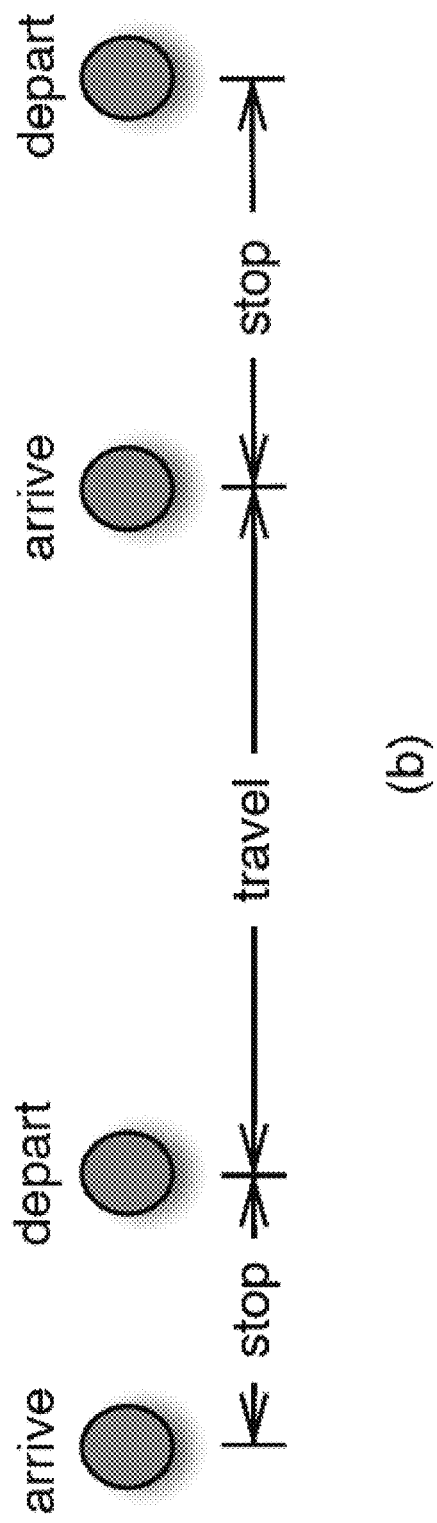

FIG. 3 is a diagram depicting an example of determining stops based on parameters of GPS readings. The top part (a) of the diagram shows the plurality of GPS readings received from one or both of the GPS devices. The position of the circles does not necessarily indicate relative location, but are arranged chronologically, based on the time the readings were taken. The circles represent the GPS readings and are equally spaced to represent the relative frequency at which the readings are made and received. The shaded circles indicate GPS readings determined to be associated with a stop while unshaded circles represent GPS readings received while the delivery vehicle 110 is engaged in an activity other than at a delivery point, such as moving, stopped in traffic, stopped for a break, moving on foot, and the like. The depicted sequence of circles includes a first unshaded circle, three shaded circles, four unshaded circles, two shaded circles, and three circles that alternate from unshaded to shaded to unshaded. The bottom part (b) of the diagram shows how the shaded circles from the top part (a) of the diagram are interpreted to be times when the delivery vehicle 110 is either stopped or when it is traveling between stops. In some embodiments, the system determines that the third, moving stop among the 4 circles in part (a) may not deviate from a particular location, or may be within a given distance from one or more of the other circles, such that the 4 consecutive GPS readings are determined to be a single stop.

As shown, the shaded circles in the top part (a) are interpreted to be associated with two stops. By comparing the top part (a) and the bottom part (b), a first sequence of sequential shaded circles identifies a first stop, a sequence of multiple unshaded circles represents the delivery vehicle 110 moving, and a second stop is identified where three out of four sequential circles are shaded. Although one of the GPS readings may indicate movement, the system can determine that where 3 of 4 consecutive readings indicate a stop. In some embodiments, other fractions or ratios can be used to determine a stop. Thus, the bottom part (b) includes a first shaded circle determined to be when the delivery vehicle 110 arrives at the first stop, a second shaded circle determined to be when the delivery vehicle 110 departs the first stop, a period of when the delivery vehicle 110 travels from the first stop to the second stop, a third shaded circle determined to be when the delivery vehicle 110 arrives at the second stop, and a fourth shaded circle determined to be when the delivery vehicle 110 departs the second stop. The determined arrival and departure points for the bottom part (b) align with the corresponding shaded circles in the top part (a).

The resulting list of GPS stops may include unplanned stops, for example stops induced by traffic. However, the resulting list of GPS stops may also omit some planned stops, such as those that are sufficiently close together that an analysis of the GPS readings from the delivery vehicle 110 is unable to distinguish between the planned stops. Accordingly, additional analysis of the GPS readings may be used to distinguish between GPS stops that include two or more planned stops and those GPS stops that are merely longer than others or average.

Reconciling Data from Two GPS Devices

In some embodiments, each delivery vehicle 110 includes two GPS devices that provide GPS readings, as described above. For example, some hardware integrated into the delivery vehicle 110 may send a first GPS signal from a first GPS device 505, and a mobile delivery device (MDD) having the second GPS device 510 can send a second GPS signal. Both of these devices may independently transmit GPS readings to one of a controller in the delivery vehicle 110 or the location management component 220. Accordingly, stops may be duplicated if the GPS readings from both of the GPS devices from the same delivery vehicle 110 are analyzed, especially because, in general, the two GPS devices will not agree precisely with respect to the locations (i.e., the longitude and latitude) of stops nor on the start or end times of the stops. Below is provided a method for reconciling stops that are independently identified from the readings of the two GPS devices but that actually refer to or represent the same stop.

When the delivery system 100 analyzes the GPS readings received from the two GPS devices of the delivery vehicle 110, the delivery system 100 gives priority to time information for the GPS readings over location information, as the time information is generally more accurate that the location information. Furthermore, if analysis of the first GPS information from one of the GPS devices indicates a stop occurred and provides details of the stop, then the delivery system determines that the stop occurred even if not supported by GPS readings from both GPS devices (e.g., the second GPS information from the second GPS device conflicts with the first GPS information). In some embodiments, if the two GPS devices are in irreconcilable disagreement, the delivery system 100 gives priority to the second GPS device (of the mobile delivery device) over the first GPS device 505 of the delivery vehicle 110, because the carrier may interact with the second GPS device 510 more than the first GPS device 505. Furthermore, the first GPS device 505 may be more vulnerable to disruption, therefore making the readings from the first GPS device 505 less reliable than the second GPS device 510. When both GPS devices identify stops at generally relative times and positions, the corresponding times and positions may be averaged because the average of the two stops is guaranteed to be more accurate in time and location than just the GPS readings from a single stop.

In some embodiments, where there is a vehicle GPS device and a mobile delivery device with GPS, the system can prioritize the time/location information from each device based on the situation or the type of stop identified. For example, when a vehicle is travelling, the vehicle GPS time and location information may be given priority over the mobile delivery device. If the vehicle GPS device indicates the vehicle is stopped, but the mobile delivery device indicates movement, the system may determine that the carrier is moving with the mobile delivery device and is away from the vehicle, and the mobile delivery device GPS is given priority. When a parcel is scanned at a delivery point, the time and/or location information from the mobile computing device may be given priority because the event is likely happening at a mailbox, a front door, etc. The mobile computing device is more likely to have an accurate location where the scan occurred.

Figure 4:
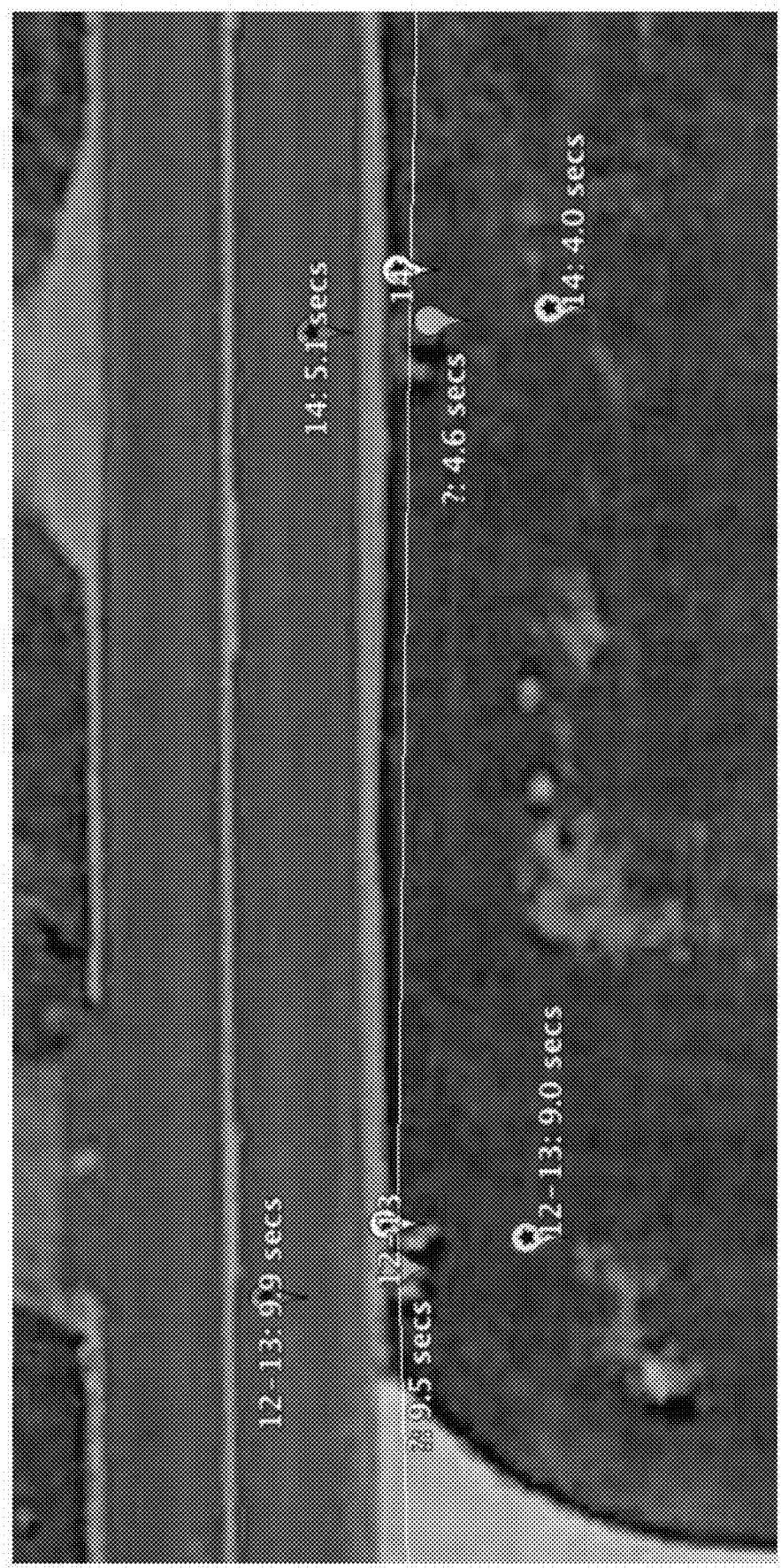
FIG. 4 is a map showing a route along a road with route stops, GPS locations from two GPS devices, and consensus stops shown.

FIG. 4 is a map showing a route 102 along a road with route stops, GPS locations from two GPS devices, and consensus stops shown. The map shows a line representing the route 102 with pins 402a and 402b that fall on the line. The line represents the route 102 while the pins 402a and 402b that fall on the line represent expected stops along the route 102. Two pins 404a and 404b shown on the road surface pertain to those GPS readings received from the first GPS device 505 of the delivery vehicle 110 while the pins 406a and 406b found in the grass away from the road represent those GPS readings received from the second GPS device 510. The fourth set of pins 408a and 408b that fall close to but not on the line representing the route 102 represent the consensus stops developed based on the average of the pins 404a and 404b from the first GPS device 505 and pins 406a and 406b from the second GPS device 510. For example, the location of the pin 408a is determined based on averaging the pin 404a from the first GPS device 505 and the pin 406a from the second GPS device 510, and the location of the pin 408b is determined based on averaging the pin 404b with the pin 406b. In this instance, the average (e.g., pins 208a and 208b) of the pins from the two GPS devices is more accurate than either GPS device individually. In general, the average is expected to be more accurate than the GPS devices individually and is guaranteed to be more accurate than the less accurate of the two GPS devices.

When one stop identified from the GPS readings of one of the GPS devices overlaps another stop identified from the GPS readings of the other of the GPS devices in time, the two stops may be combined and/or considered as being the same stop. If more than two stops overlap, all of the overlapping stops may be combined and/or considered as the same stop. For example, a set S of stops overlap if, for any two stops s1 and sn in the set, there is a sequence of stops in S where s1 overlaps s2, s2 overlaps s3, and so on, until sn−1 overlaps sn. If these conditions are met, then the set S of stops is combined and/or considered as a single stop. As such, not all of the stops in the set S must overlap all the other stops. Instead, for each stop in the set S, each stop must overlap at least one other stop in the set S. The GPS readings from the GPS devices may be considered such that such a sequence of stops S is maximized, meaning that all potential stops are added to the sequence of stops S without invalidating the sequential, paired overlapping requirement described above. In some embodiments, the overlapping set S consists of two subsets, one comprising the stops identified by one of the GPS devices and the other comprising the stops identified by the second of the GPS devices. In some embodiments, no pair of stops in each respective subset overlap. However, if both subsets are non-empty, each stop of the first subset may overlap at least one stop of the second subset, and vice versa. The process described above identifies maximal overlapping sets of stops and builds a single consensus stop from each, for example, based on GPS stops reported by the first GPS device 505 and GPS stops reported by the second GPS device 510 can be reconciled (for example, determined to be a common stop or overlapping, if applicable).

Various algorithms may be implemented to maximize overlapping sets of stops. In an exemplary algorithm, the delivery system 100 identifies an initial stop for the set of overlapping stops, as determined from readings from either GPS device having the earliest arrival time, for example from the GPS device 505. The delivery system 100 then monitors the second GPS device 510 to determine whether its readings identify another stop that overlaps with the initial stop. If the stops do not overlap, then the initial stop becomes a consensus stop by itself. If the stops do overlap, then the delivery system joins the initial stop and the stop identified from the second GPS device 510 that the delivery system can eventually merge into a single stop comprising the overlapping set of stops.

Matching GPS Stops with Route Stops

The delivery system 100 may match GPS stops with route stops. In determining whether to adjust and/or how to adjust existing routes, such as the route 102, the delivery system 100 matches identified and/or tracked stops based on the GPS readings from the GPS devices of the delivery vehicle 110 to stops along the route 102. Stops identified by the GPS readings that are matched with expected stops on the route 102 then become planned stops while those that are not associated with expected stops are unplanned stops. The delivery system 100 may match a stop identified based on the GPS readings with an identity (including, for example, a type, a location, a reason, a work-content model, etc.) of a planned stop along the route 102 when the delivery system 100 matches the stop to one of the planned stops.

Figure 5:
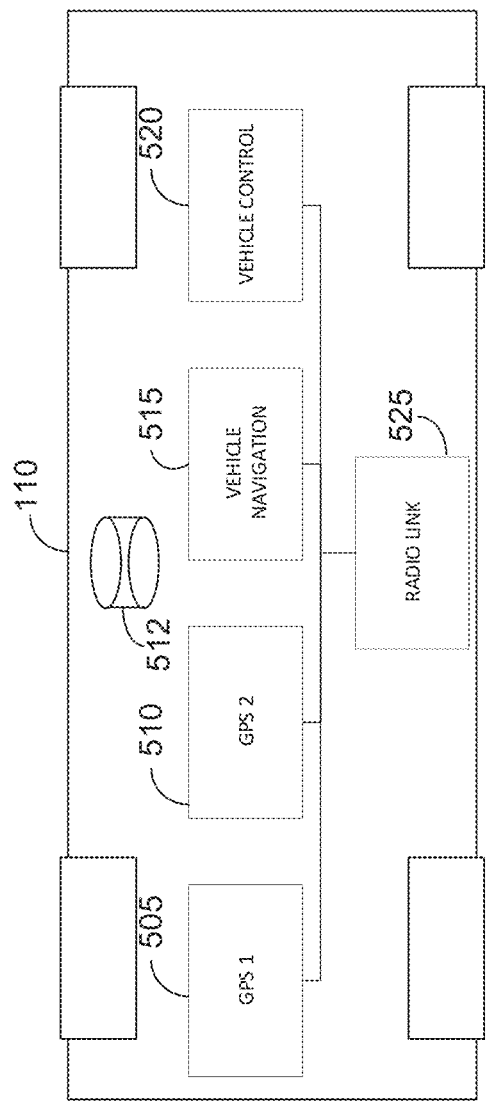
FIG. 5 is a block diagram of an exemplary delivery vehicle.

FIG. 5 is a block diagram of an exemplary delivery vehicle 110. The delivery vehicle 110 shown in FIG. 5 may be an exemplary embodiment of the delivery vehicles 110a-b shown in FIG. 1. The exemplary delivery vehicle 110 includes a first global positioning system (GPS) receiver 505, a second GPS receiver 510, a vehicle navigation component 515, a vehicle control component 520, and a radio link 525. The radio link 525 may enable one or more of the first GPS receiver 505, second GPS receiver 510, vehicle navigation component 515, or vehicle control component 520 to communicate wirelessly with other components of the disclosed methods and systems, such as any of the components shown in FIG. 2.

The first GPS receiver 505 and second GPS receiver 510 may receive GPS signals from GPS satellites to determine a position of the delivery vehicle 110. This information may be reported, via the radio link provided via radio link component 525, to for example, the vehicle location management component 220 in some aspects. This may enable the disclosed methods and systems to maintain a current record of a location, heading, speed, etc., of the delivery vehicle 110, and of multiple delivery vehicles 110 managed by the delivery system, such that the delivery system is able to monitor and/or adjust routes 102 as necessary to improve efficiencies.

The vehicle navigation component 515 may control navigation of the delivery vehicle 110 along a route. Route information may be retrieved from the route database 512. In some aspects, the vehicle navigation component 515 may receive route updates via the radio link 525, from, for example, the vehicle route control component 230, illustrated with respect to FIG. 2. The vehicle navigation component 515 may provide instructions to the vehicle control component 520. For example, the vehicle navigation component 515 may send commands such as a command to turn the delivery vehicle 110 to a particular heading, stop the delivery vehicle 110, or drive the delivery vehicle 110 at a particular speed to the vehicle control component 520.

The vehicle control component 520 may provide autonomous, electronic control of the delivery vehicle 110 in some aspects. As discussed above, the vehicle control component 520 may receive commands such as a command to turn to a particular heading, stop, or drive at a particular speed from a vehicle navigation component. The vehicle control component 520 may maintain electronic interfaces with vehicle systems, such as braking systems, engine systems, and steering systems (not shown in FIG. 5) that can affect the commands received from the vehicle navigation component. In aspects of the delivery vehicle 110 that may be manually controlled by a human operator, the vehicle control component 520 may function to display instructions to the human operator to effect particular routes. For example, upon receiving a command to move the vehicle to a particular address, the vehicle control component may display the address on a display screen of the vehicle, such that the human operator can read the display screen and drive the vehicle to the address. In some aspects, the human operator may be assisted by a navigation application that provides route information to the commanded address.

Figure 6:
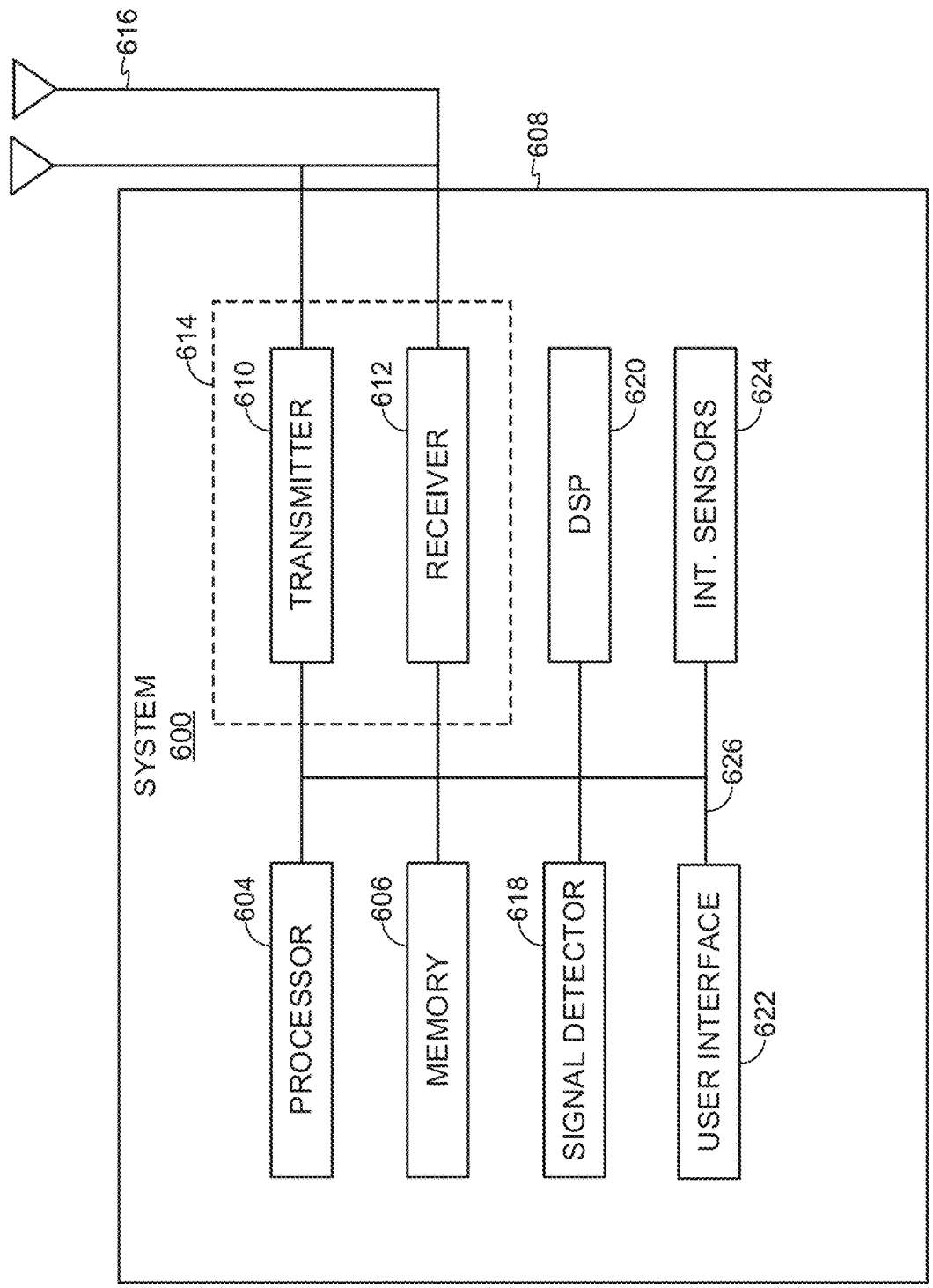
FIG. 6 illustrates a block diagram of an embodiment of a system 600 which may be used in the DISTRIBUTION NETWORK described above to receive and process information regarding item delivery routes.

FIG. 6 illustrates a block diagram of an embodiment of a system 600 which may be used in the distribution network described above to receive and process information regarding item delivery routes. The system 600 is an example of a system or device that may be configured to implement the various methods, steps, and functions described herein. For example, the system 600 may perform one or more of the steps or functions described herein regarding route optimization, manage and analyze inputs, determine carrier activities and routes, and other route information. In some embodiments, as described herein, the system 600 may implement and/or correspond to one or more of the components of the delivery system 100 or perform one or more of the methods described herein.

The system 600 includes a processor 604 and a memory 606. The processor 604 controls operation of the system 600. The processor 604 may also be referred to as a central processing unit (CPU). The memory 606, which may include both read-only memory (ROM) and random access memory (RAM), provides instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable to implement the methods described herein.

The processor 604 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the processing system may include, e.g., hardware, firmware, and software, or any combination therein.

The system 600 may also include a housing 608. The system 600 further comprises a transmitter 610 and a receiver 612 to allow transmission and reception of data between the system 600 and a remote location or device. The transmitter 610 and receiver 612 may be combined into a transceiver 614. In some embodiments, the transmitter 610 and receiver 612 can be separate components. An antenna diversity system or array 616 may be attached to the housing 608 and electrically coupled to the transceiver 614 to enable wireless communications, although either wired and wireless communications are envisioned. The system 600 may include (not shown) multiple transmitters, multiple receivers, multiple transceivers, and/or multiple antennas diversity systems.

The transmitter 610 can be configured to wired or wirelessly transmit messages. The processor 604 may process messages and data to be transmitted via the transmitter 610. The receiver 612 can be configured to receive wired or wireless messages. The processor 604 may further process messages and data received via the receiver 612.

The system 600 also include a signal detector 618 that may be used in an effort to detect and quantify the level of signals received by the transceiver 614. The signal detector 618 may detect such signals as total energy, energy per subcarrier per symbol, power spectral density and other signals. The system 600 may also include a digital signal processor (DSP) 620 for use in processing signals. The DSP 620 may be configured to generate a packet for transmission.

The system 600 may further comprise a user interface 622 in some aspects. The user interface 622 may comprise a keypad, a microphone, a speaker, and/or a display, among others. The user interface 622 may include any element or component that conveys information to a user of the system 600 and/or receives input from the user.

The various components of the system 600 may be coupled together by a bus system 626. The bus system 626 may include a data bus, for example, as well as a power bus, a control signal bus, and a status signal bus in addition to the data bus. Those of skill in the art will appreciate that the components of the system 600 may be coupled together or accept or provide inputs to each other using some other mechanism.

Although a number of separate components are illustrated in FIG. 6, those of skill in the art will recognize that one or more of the components may be combined or commonly implemented. For example, the processor 604 may be used to implement not only the functionality described above with respect to the processor 604, but also to implement the functionality described above with respect to the signal detector 618 and/or the DSP 620. Further, each of the components illustrated in FIG. 6 may be implemented using a plurality of separate elements.

Figure 7:
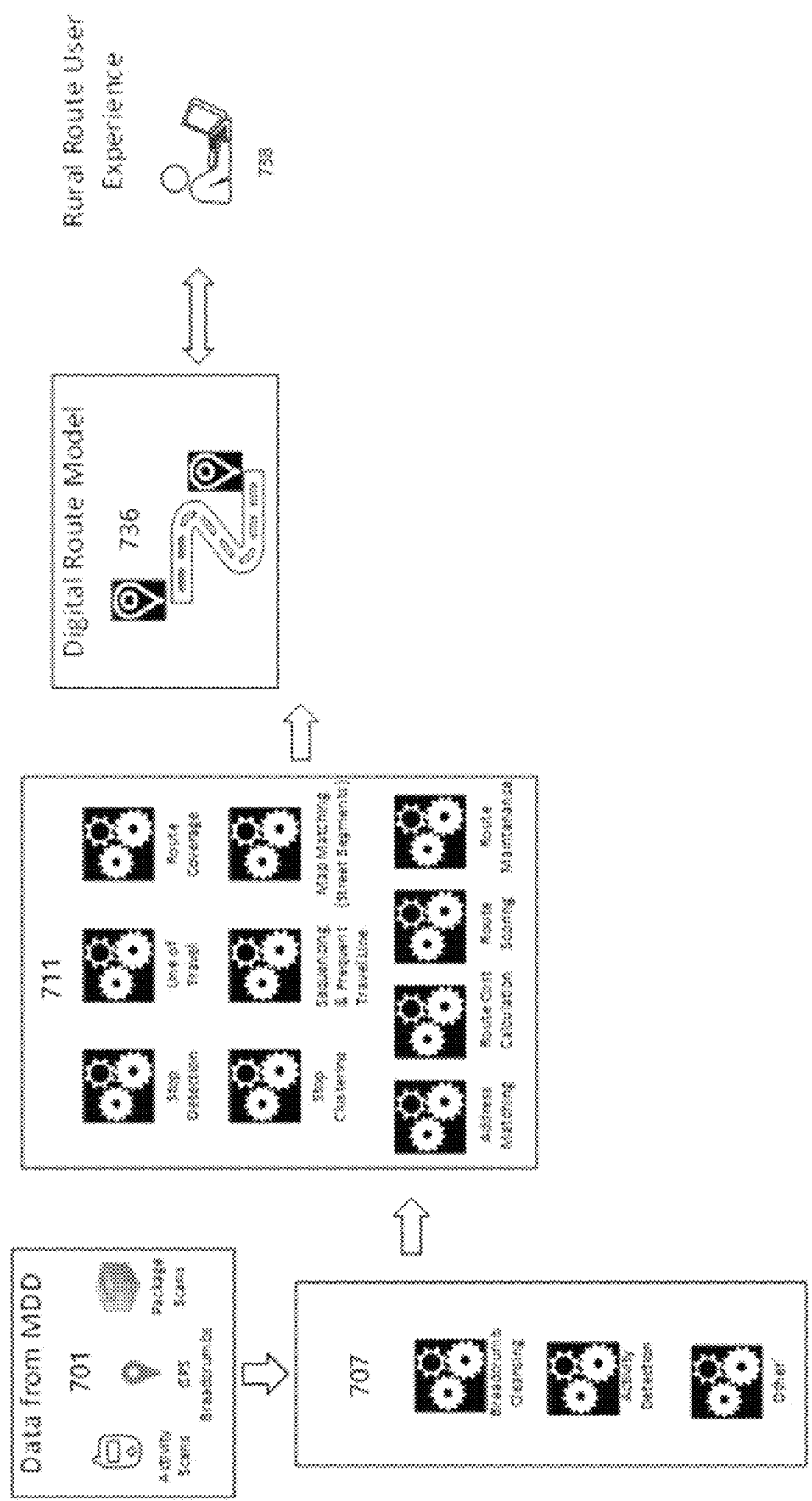
FIG. 7 shows a data flow diagram for a GPS and route processing system. In some embodiments, the processes and modules shown are implemented by one or more components of the system.

FIG. 7 shows a data flow diagram for a GPS and route processing system. A PTR database 1022 may comprise a database that stores outputs, such as item scans or other scans from the MDD 1020. The PTR database 1022 provides those scans to the storage 1018. In some embodiments, the processes and modules shown are implemented by one or more components of the system 600. As shown, FIG. 7 provides some exemplary details for two of the four basic steps introduced above: the gathering route data and the generating a digital route steps.

The gathering route data step may comprise the active and/or passive data collection described above. For example, with reference to FIG. 7, GPS breadcrumbs received from the carrier's MDD 701 may be collected and stored before, while, or after the carrier services an assigned route, thereby providing data (for example, activity data, location data, and so forth) for various activities and stops as the carrier's travels along the route. In some embodiments, the gathered route data also includes information regarding activities that the carrier performs prior to, while, or after traveling the assigned route. Additionally, package and/or parcel scans may also be obtained from the carrier's MDD 701, along with activity scans of what the carrier is doing at various times/locations along the route. Furthermore, the gathered route data may include address data and/or route data as received from one or more address and/or road network data sources. For example, the gathered route data includes mail count results or master list data. The gathered route data may be processed; for example, the GPS breadcrumbs are processed to identify stops along the route and the travel path taken by the carrier. Furthermore, all data received from the carrier's MDD 701 is processed to determine what activity or activities the carrier is performing at any given time.

FIG. 7 depicts components of the input data and processing that the system 600 uses to generate digital routes that carriers are servicing, including both the in-office (distribution facility) and street portions. The data flow begins with the system 600 receiving or gathering data from the carrier's MDD 701.

In some embodiments, the data received from the carrier's MDD 701 may begin with login information or other setup information that indicates that the carrier is activating or preparing the MDD 701 for the day's activity, and can include a carrier identifier which uniquely identifies a carrier. The data can also include a route identifier which uniquely identifies the route the carrier and the MDD 701 traverse, are traversing, or will traverse. In some embodiments, such information may be received via one or more activity scans. The carrier's MDD 701 may also provide GPS breadcrumbs and package scans.

In some embodiments, the activity scans may include information regarding activities that the carrier performs before embarking on the street portions of the route. In some embodiments, such activity scans may include scans regarding preparing items for the upcoming route, loading the delivery vehicle 70, and so forth. The GPS breadcrumbs may be received in one second intervals and may include GPS location information and time information. The package scans may include information from the MDD 701 regarding packages that are scanned for pickup or delivery by the carrier while along the route. In some embodiments, the package scans are received before the carrier embarks on the route, while traversing the route, and after arriving back to the distribution facility after the route is completed.

The data received from the MDD 701 may be processed at block 707. The initial processing may include daily processing that includes cleansing the GPS breadcrumbs and activity detection. The GPS breadcrumbs may be cleansed and/or processed to determine what activity is performed for each GPS breadcrumb or group of GPS breadcrumbs. That is, the GPS, accelerometer, and/or gyroscope breadcrumb data, or any combination thereof, is analyzed to determine what action the carrier is performing and/or where the carrier is located when the GPS breadcrumbs are received. In some embodiments, cleansing or processing the GPS breadcrumbs comprises parsing location and time information. In some embodiments, the initial processing also includes daily processing or activity detection of the activity scans information. For example, such processing comprises determining that the activity scans includes a scan or information that indicates that whether the carrier is activating the MDD 701 or walking to or loading the delivery vehicle 110 being used for the day. In some embodiments, based on the activity detected by the activity detection, the system 600 may assign one or more activities to the carrier's route. The assigned activities may be identified from a list of possible activities, some of which are identified in Table 1 below.

Carrier routes include various aspects of a carrier's daily workload. For example, while the carrier route includes traversing the corresponding path between delivery points and delivering the items, the carrier route may also include activities that the carrier performs to prepare for the route before leaving the distribution facility to travel to each delivery point and activities performed after the carrier returns to the distribution facility after visiting all assigned delivery points. Some of these activities may include setting up the carrier's MDD, walking within the distribution facility, gathering the items they will be delivering, casing, and the like. A more detailed listing of some of these actions is provided in Table 1 below.

TABLE 1

| Sequence Description | Standards Applied | Location/Time | Classification |
|---|---|---|---|
| Scanner setup activities | S001: Scanner Setup | Office am | Fixed |
| Office Walking | S002: Office walking speed | Office am | Volume |
| Gather random mail for transport to case | S003: Gather random mail | Office am | Fixed |
| Case random letters | S004: Case random letters | Office am | Volume |
| Case random flats | S005: Case random flats | Office am | Volume |
| Case carrier route flats | S006: Case Carrier Route flats | Office am | Volume |
| Gather DPS letters for transport to case | S007: Gather DPS letters, S200: DPS letters per tray | Office am | Volume |
| Locate and access DPS letter trays | S008: Locate and access DPS letter trays | Office am | Fixed |
| Case DPS letters | S009: Case DPS letters | Office am | Volume |
| Case WSS flats | S010: Case WSS flats | Office am | Volume |
| Case WSS letters | S011: Case WSS letters | Office am | Volume |
| Case Boxholder flats | S012: Case Boxholder flats | Office am | Volume |
| Case Boxholder letters | S013: Case Boxholder letters | Office am | Volume |
| Gather DPS flats for transport to case | S014: Gather DPS flats, S201: DPS flats per tray | Office am | Volume |
| Locate and access DPS flat trays | S015: Locate and access DPS flat trays | Office am | Fixed |
| Case DPS flats | S016: Case DPS flats | Office am | Volume |
| Pull down handle trays | S017A: Pull down - handle tray, S219: Fraction of small parcels in sm-med total, S220: Pull down mail pieces per tray | Office am | Volume |
| Pull down handful | S017B1: Pull down - handful, S221: pull down mail pieces per handful/rubber band | Office am | Volume |
| Pull down compartments | S017B2: Empty 1 or 2 compartments. | Office am | Offc/Rte |
| Position and remove rubber bands | S017C: Position and remove rubber band, S221: pull down mail pieces per handful/rubber band | Office am | Volume |
| Gather parcels for transport to case | S018: Gather parcels, S208: Parcels per hamper | Office am | Volume |
| Organize large parcels for delivery | S019: Organize large parcels, S209: Lg parcels in accountables | Office am | Volume |
| Organize small/medium parcels for delivery | S020: Org sm and med parcels, S210: Sm & med parcels in accountables | Office am | Volume |
| Process accountable mail, signature items | S021: Process accountable mail, signature items | Office am | Volume |
| Process customs due | S022: Process customs due | Office am | Volume |
| Process COD | S023: Process COD | Office am | Volume |
| Process postage due | S024: Process postage due | Office am | Volume |
| Perform fixed accountable cage activities | S025: Perform fixed accountable cage activities | Office am | Fixed |
| Process carrier pick-up | S026: Process carrier pick-up | Office am | Volume |

TABLE 1-continued

| Sequence Description | Standards Applied | Location/Time | Classification |
|---|---|---|---|
| event forms | event forms | | |
| Process markups-bundles | S027: Process markup bundles, S211: Markup bundles per addressed mail pc | Office am | Volume |
| Process change-of-address forms | | | |
| Process PARS label | S029: Process PARS label | Office am | Volume |
| Complete trip report | S030: Complete trip report | Office am | Fixed |
| Move trays to storage | S031: Move trays to storage | Office am | Fixed |
| Load vehicle | — | Office am | Actual time |
| Inspect Government vehicle | S032: Inspect Government vehicle | Office am | Fixed |
| Drive (basic route) | — | Street - rte | Offc/Rte |
| Walk (basic route) | — | Street - rte | Offc/Rte |
| Service (basic route) | — | Street - rte | Offc/Rte |
| Drive (mail stop to DDD stop) | S033: Driving speed (mail stop to DDD stop) | Street-door | Volume |
| Walk (DDD stop to door) | S034: Walking speed (DDD stop to door) | Street-door | Volume |
| Deliver parcels to door | S035: Deliver parcels to door | Street-door | Volume |
| Deliver parcels to mailbox | S036: Deliver parcels to mailbox | Street - rte | Volume |
| Deliver parcels to parcel locker | S037: Deliver parcels to parcel locker | Street - rte | Volume |
| Deliver accountable mail, signature item | S038: Deliver accountable mail, signature items | Street-door | Volume |
| Deliver customs due | S039: Deliver customs due | Street-door | Volume |
| Deliver COD | S040: Deliver COD | Street-door | Volume |
| Collect postage due | S041: Collect postage due | Street-door | Volume |
| Collect registered/certified mail | S042: Collect registered/certified mail, S212: fraction reg-cert per address | Street-door | Offc/Rte |
| Collect money order applications | S043: Collect money order applications, S213: fraction money order per address | Street-door | Offc/Rte |
| Accept ord, cod, ins parcels | S044: Accept ord, cod, ins parcels, S214: fraction ord, cod, ins per address | Street-door | Offc/Rte |
| Carrier pickup & prepaid event | S045: Carrier pickup & prepaid event | Street-door | Volume |
| Carrier pickup & prepaid items | S046: Carrier pickup & prepaid items | Street-door | Volume |
| Perform prelim & concluding activities at vehicle for trip to door | S047: Prelim & concluding at vehicle for trip to door | Street-door | Volume |
| Gather accountable mail/large parcel at vehicle | S048: Gather accountable mail/large parcel at vehicle | Street-door | Volume |
| Deviation for express delivery (walk or drive) | — | Street-door | Actual time |
| Service (blue box) collection points | S049: Service (blue box) collection points | Street - rte | Offc/Rte |
| Service inter-unit mail (low volume) | S050: Service inter-unit mail (low volume) | Street - rte | Offc/Rte |
| Service inter-unit mail (high volume) | S051: Service inter-unit mail (high volume) | Street - rte | Offc/Rte |
| Fuel vehicle | S052: Fuel vehicle, S215: constant for refueling miles per refuel | Street - rte | Offc/Rte |
| Reload mail for delivery | S053: Retrieve first mail tray behind bulkhead, S054: Retrieve additional mail trays behind bulkhead, S055: Retrieve first mail tray under platform, S056: Retrieve additional mail trays under platform, S057: Retrieve first mail tray rear door, S058: Retrieve additional mail trays rear door, S202: Random letters per tray, S203: Random flats per tray, S204: Small parcels per tray, S205: Boxholders per tray, S200: DPSL per tray, S201: DPSF per tray, S218: Fraction of med parcels in sm-med total, S219: Fraction of small parcels in sm-med total | Street - rte | Volume |

TABLE 1-continued

| Sequence Description | Standards Applied | Location/Time | Classification |
|---|---|---|---|
| Reload medium parcels for delivery | S059: Retrieve first med parcels tub behind bulkhead, S060: Retrieve addl med parcels tubs behind bulkhead, S061: Retrieve first med parcels tub rear door, S062: Retrieve addl med parcels tubs rear door, S206: Med parcels per tray, S218: fraction medium parcels in sm-med total | Street-rte | Volume |
| Reload large parcels for delivery | S063: Move large parcels from cargo area to rear door, S064: Move addl large parcels cargo area to rear door, S209: Fraction lg parcels in accountables. | Street - rte | Volume |
| Perform simple one-step scans | S065: Perform simple one-step scans | Office am Street door | Volume |
| Perform prompted two-step scans | S066: Perform prompted two-step scans | Office am Street door | Volume |
| End-of-shift office activities | — | Office pm | Actual time |
| Contact Rural Reach customers | S067: Contact Rural Reach customers | Street - rte | Volume |
| Sell stamp stock | S068: Sell stamp stock | Street - rte | Volume |
| Total Actual Time - Office | — | NA | NA |
| Total Actual Time - Street | — | NA | NA |
| Total Standard Time - Office | — | NA | NA |
| Total Standard Time - Street | — | NA | NA |
| Total Lunch Time - Office | — | NA | NA |
| Total Lunch Time - Street | — | NA | NA |
| TCP Duration | — | Street - rte | Offc/Rte |
| Carrier pickup item and manifest scans | S070: Full scan. S071: partial scan | Street - rte | Volume |
| Miscellaneous activities | | Offc and street | Actual time |
| Safety service talks | S002: Office walking speed | Office am | Actual time |
| Office Walking - DPSL | S002: Office walking speed | Office am | Volume |
| Verify addresses | S144: Verify letter address, S145: Verify flat address, S219: Fraction of small parcels in sm-med total | Street - rte | Volume |
| Miscellaneous to door deliveries | S069: Deliver miscellaneous to door | Street - rte | Volume |

For example, if the activity detection determines that the carrier activated the MDD 701 and walked to the delivery vehicle 110, and loaded the delivery vehicle 110, these three activities (activating the MDD 701, walking to the delivery vehicle 110, and inspected the delivery vehicle 110, corresponding to standards S001, S002, and S032) are automatically added to the carrier's route for the day by the system 600. The data for in-office activities can be generated by the MDD, and/or can be generated based on scans, logins, etc., of equipment and facilities in the office. Each action of a carrier's route can be assigned to an activity from Table 1. In some embodiments, a carrier's route can be determined by agglomerating or collecting and ordering all the detected activities for a carrier for a given time period. Using scans, GPS data, and other sources of data, the timeline for a carrier's day can be populated by a sequential list of standards performed by the carrier.

The activity detection allows the delivery system 100 to identify or assign, for each portion of the a digital model of a route, or to an optimized route, which standard applies to the portion, when that portion occurs, and whether that portion involves a variable or fixed time. Thus, the activity detection and/or the delivery system 100 assigns standards to each portion of the optimized route. Nominal routes may also have standards assigned to each portion of the nominal routes. Where each portion is associated with a standard, the standards for the respective route may be further used to determine a total amount of time and activities associated for the digital model, optimized, or nominal route. Thus, the delivery system 100 may use the standards to identify times associated the optimized or nominal route. In some embodiments, when the route data is collected from carrier devices or mobile computing devices, the individual route segments, data points, GPS location breadcrumbs, or other divisions, sections, or parts of the route data can be assigned a task standard or an activity standard from the table above. In addition, a nominal route can have each section of the route, each segment of time, etc., can each be assigned a standard. Thus, route data can include a plurality of standards according to the activity or event performed along a route, during a delivery day, etc.

The solver 711 may perform one or more actions or steps that are used to generate the digital route corresponding to the carrier's actual route. In some instances, the solver 711 and/or the processing of block 707 may be performed by the processor 604 of the system 600 of FIG. 6. For example, the solver 711 may perform stop detection, identification of a line of travel of the carrier, identification of route coverage, stop clustering, identification of sequencing and frequent travel lines, map matching, address matching, and the like, as shown in FIG. 7.

Improving Routes

Route optimization is a scalable, technology-based solution for detecting errors, departures, issues in a route and for optimizing and/or reconfiguring routes serviced and traveled by carriers. In some embodiments, one or more of the components of the delivery system 100 performs the route optimization. For example, one or more of the route cost management component 240, the route management component 205, the vehicle route control component 230, or so forth performs the route optimization via, for example, the components of the system 600. The delivery system 100 may use route optimization to improve efficiencies of routes traveled by carriers associated with the delivery system 100. In some embodiments, improved efficiencies of the routes may be measured by a reduction in mileage traveled and/or time expended by carriers when servicing a route as compared to un-optimized routes. Reductions in the mileage travel and/or time expended on the optimized routes may lead to additional improvements by reducing vehicle expenses (for example, due to reduced vehicle wear from shorter routes or less time traveling routes) and carrier and/or route evaluations. In some embodiments, the route optimization comprises at least two features, including route resequencing and unit optimization. Route resequencing may comprise identifying an optimal sequence and line of travel through a route's delivery points, for example as identified based on the GPS breadcrumbs and corresponding analysis described herein. Unit optimization may comprise identifying optimal delivery routes for a given unit delivery facility, or another facility, for example, a district, a region, and so forth, based on of constraints described herein.

Route optimization may involve improving one or more aspects of the route to improve carrier efficiency while servicing the route and reducing costs associated with the route. For example, routes can be optimized by splitting routes, combining routes, altering routes, by reallocating delivery points between routes, and changing the delivery sequence, or any combination of these. In some embodiments, these costs may include any costs for servicing the route (for example, equipment costs, carrier costs, time costs, etc. In some embodiments, the route optimization is performed by a hardware processor 604 of FIG. 6 or a system comprising a hardware processor 604 and includes a plurality of functions or steps. Each of these functions or steps, when taken together as a whole or individually, may provide for execution, tracking, and implementation of route optimization. However, before the existing routes can be optimized, details of the existing routes must be identified and quantified to establish a baseline and/or identify aspects of the routes to optimize.

Standardizing Routes

As introduced above, optimizing routes may initially involve identifying activities involved with each route and identifying characteristics of those activities. In some instances, identifying activities for routes involves defining standardized activities. Defining standardized activities for each route enables the delivery system 100 to analyze different routes in a simplified manner. For example, all routes consist of a combination of different activities, including walking and/or driving to and/or between different stops, deliveries, etc. Specifically, different stops may comprise different distances between combinations of stops, different types of stops (for example, the stops at traffic control points (TCPs), delivery points, pickup points, etc.), and the like. By separating the route into the standardized segments (for example, of specified distances, stops, and the like), the delivery system 100 can analyze different routes in the simplified manner. Thus, the delivery system 100 can identify a total length of the route by simply aggregating the time durations for each segment of the route. For example, if a route has two delivery point stops separated by a stop sign placed equidistantly from the delivery point stops, the total time for traveling the route may comprise the time to travel between the delivery point stop and the stop sign (T1), the time spent at the stop sign (T2), and the time to travel between the stop sign and the second delivery point stop (T3). Where the times to travel between the delivery point stop and the stop sign are the same (T1=T3), the time to travel the route is equal to 2*T1+T2. Thus, each route can be broken down to a combination of different times and then aggregated, where the times for the individual, standardized segments are stored in a database (for example, in a table, matrix, or other format). The segments of a route can be a standard length across different routes, and can be measured in terms of distance, number of stops, time, and others, or any combination of these. In some embodiments, the segments can be different for each route, and can be dynamically determined according to individual route requirements. Accordingly, the standardization of the route involved breaking the routes into standard segments that can be handled in aggregate with other standard segments.

However, how the delivery system 100 defines each of the standard activities and how to generate the standard time for the standard activity and for the total route may be difficult and resource intensive. Specifically, determining drive time standards for the carrier and the delivery vehicle 110 while traveling the route may be particularly difficult in view of variations in or along the route, such as traffic, traffic control points, mail quantities, mail stops, changes in the environment, topography, and the like. In some instances, the drive time standards may be determined based on or using motion-time systems, for example, using statistical analysis. In some instances, the generated standard times only relate to the activities performed while and/or involved with the carrier and delivery vehicle 110 traveling the route.

For example, the processor 605 of the delivery system 100 may identify standards for different activities of the route, for example standard driving times between portions of the route and standard times spent at different stops (for example, traffic control points and/or delivery points). This set of activities, which can be expanded to include activities the delivery resource performs before leaving a unit delivery facility to travel the route, such as casing, sorting, loading, etc., and activities the delivery resource performs upon returning to the unit delivery facility, in addition to the activities and actions the carrier performs along the route, can be defined according to a number of guidelines. The delivery system 100 may employ various guidelines that enable generation of the digital route (i.e., the digital representation of the route). For example, the guidelines may enable the delivery system 100 to account for the workday pace that allows the delivery resource to complete all activities for the route, where each activity is performed according to a particular method. The guidelines may also ensure that the delivery resource performs the activities of the route sequentially, with no two activities, or portions thereof, overlapping in time, where each activity of the route is defined such that each performance of the activity utilizes substantially the same amount of time and such that a number of times the activity occurs or is performed can be quantified consistently and accurately.

As introduced above, the processor 605 may use the drive speed standards to determine a speed at which the delivery vehicle 110 and carrier optimally or desirably travel during a defined segment or portion of the delivery route. The speed for the delivery vehicle 110 during these portions (and thus, the drive speed standards) are governed primarily by the length of the distance driven from one full stop to the next full stop, which may include one or more relevant segments or portions. The drive speed standards may be calculated by first defining an interval as the distance, for example, in feet, from a first point or stop, for example, one mailstop, traffic control point, and/or segment end point to a next point or stop, such as a next mailstop, traffic control point, and/or segment end point, among other route items. In some embodiments, the drive speed standard can take into account the type of road and speed limit of the segment, road construction status, etc. Furthermore, intervals between mapped stops can be defined as valid intervals when breadcrumb paths indicate stops at corresponding locations without any unidentified stops occurring between the indicated stops. Distances between these mapped stops can be determined and travel times for the interval between the stops is calculated. Based on this information, the delivery system 100 can calculate an average speed that the delivery vehicle 110 and/or carrier travels between each pair of mapped stops. The speed calculations can be in feet per second, miles per hour, or the like. Once the delivery system 100 is aware of the all of the speeds between pairs of mapped stops, the delivery system 100 can sort interval speeds into predetermined distance ranges based their mapped distances. Thus, based on this information, the delivery system 100 can identify expected average speeds for the carrier and/or delivery vehicle 110 based on different distances between stops thereby creating a drive speed matrix (DSM) that includes the mean drive speed for each distance range is calculated from the data points sorted to it.

The delivery system 100 can utilize the DSM comprising a number (for example, approximately 50) of distance ranges. However, the DSM will generally not account for delays, which may be unavoidable. For example, a carrier may face traffic, vehicle operational issues, changes in the route, and the like, obstacles that do not exist in the digital route and, thus, are not accounted for in the DSM. However, the delays may be difficult to place into specific places in a given route. Instead, the delays may be assigned a percentage of effect they have on the routes; specifically, the delays may be averaged and assigned a percentage for each route, thus allowing the delivery system 100 to account for the delays in a general manner without having to expend effort and/or time to specifically identify delays and update each route with the identified delays. Thus, the delivery system 100 may add a particular amount of time to each route to account for the average, thus ensuring that the delays are accounted for in all routes because the delays are unavoidable. In some instances, the delivery system 100 may use one or more algorithms to identify the DSM, which can be used to estimate driving times and speeds between stops on any given route. Furthermore, the DSM values may also include allowances in the drive times and speeds to account for differences between carriers and other differences that may exist between routes (for example, speeds of movement, and the like). Accordingly, the DSM may include values that, in average, can be used to adapt and approximate different routes to consider average and/or expected delays and/or differences between routes, thereby making the DSM applicable for all routes serviced by the delivery system 100.

In addition to the DSM, the delivery system 100 can identify time lost along the route to traffic control points (TCPs). The digital route can be created from the breadcrumb and other data, and TCPs can be inferred and inserted into the digital route. For example, the TCPs identified for each route comprise one or more of stop signs, traffic signals, yield signs, crosswalks, railroad crossings, access gates, and the like. The TCPs for each route may be identified based on analyzing the breadcrumb data along the route or based on inputs from the carrier, and each route may comprise one or more different TCPs. Even when the TCP is identified by the inputs from the carrier, the breadcrumb data may be used to verify that the TCP does exist and/or to confirm how often the TCP impacts the carrier's route. For example, the breadcrumb data is reviewed and compared to the TCPs previously identified on the route to confirm that when a TCP exists on the route, the breadcrumb data indicates that the carrier stopped in response to the TCP. The delivery system 100 may record the TCP when the breadcrumb data and the algorithm determine that the breadcrumb data represents a TCP. Furthermore, the delivery system 100 may track an amount of time that the carrier spends or stops at a given TCP, for example, by identifying an amount of time from a first breadcrumb when the carrier arrives at the TCP to a second breadcrumb when the carrier leaves the TCP, accelerometer data showing little or no movement for successive readings, gyroscope information, etc. These times can be measured in any unit of time, including minutes, seconds, and the like, and portions thereof. The delivery system 100 may identify an average stop time for each TCP or TCP category, which is then used to generate the travel time for the route based on a number of each TCP along the route. The methods described herein to calculate the DSM and TCP times and corresponding information work well for standardized events (for example, identifiable and repeated TCPs or activities along the route).

In generating the standard time for serving or traveling a route, the delivery system 100 may utilize the DSM and TCP times along with fixed or constant values for or associated with one or more actions or sequences of actions. These constant values may represent practical methods of accounting for time periods of the route that are otherwise impractical and/or expensive to determine individually. In some instances, the constant values may comprise constant time values that can be aggregated directly into the time of the route, for example, times spent exiting the delivery system distribution point or refueling and the like. Alternatively, or additionally, the constant value may be a factor in determining a time, for example a number of items per tray, where the tray has a processing time associated therewith (and where processing times associated with individual items may not be practical to identify). These constant values may be used in sequences with low standard time values.

The standard times for routes can be established using the DSM, TCPs, and any adjustments or other factors. The standard times can be confirmed by a delivery resource, after which the standard times can be used to evaluate delivery resource efficiency as routes are traversed. If anomalies are found, routes can be readjusted, the DSM and/or TCPs, or other factors, may be recalculated, or other factors included.

Route Optimization

The route optimization includes the processor 604 applying one or more compensation standards to the route serviced by the carrier. The compensation standards for the route may directly impact the costs for the route, and, thus may be relevant to optimizing the route for at least this reason. In some embodiments, applying the one or more compensation standards to the route involves using the current compensation standards to determine a cost for the route. In some embodiments, the compensation standards may be fluid and changeable; the system 600 or processor 604 should be able to adjust the route optimization based on the latest standards to apply.

The route optimization further includes the processor 604 performing service demand preparation. Service demand preparation for a route may include identifying one or more delivery locations that require service along the route. As delivery locations along a route change (for example, due to new construction, moves, etc.), the route may be automatically (for example, automatically at predetermined, calculated, or customized periods) updated or updated on demand (or based on a threshold number of known changes along the route), and so forth, to ensure that the route includes the most update-to-date and correct delivery point information. Ensuring that the route includes the proper delivery points may allow the route optimization to focus on actual costs as opposed to costs that no longer apply because a corresponding delivery point no longer exists or without excluding actual costs when the digital route does not include a stop that the carrier is required to make along the route.

The route optimization performed by the processor 604 further includes route prioritization. Route prioritization may include identifying routes and delivery locations (for example, within an area serviced by a distribution center). For example, when the distribution center services, for example, three neighborhoods in close proximity to each other with three separate routes, route prioritization analyzes options to consolidate the three routes into two routes or benefits of separating the routes into additional routes. Such route prioritization may focus on time cost, service standards, or other savings by reprioritizing the routes (for example, changes in associated costs) and confidences in the digital routes.

The route optimization further includes route reconstruction, as generally performed, for example, by the processor 604. Route reconstruction may involve generating or regenerating update digital routes for field communication and implementation tracking.

The route optimization performed by the processor 604 further includes cost savings calculations. These calculations may be predictive, identifying potential cost impacts that would result from optimization. When such calculations predict reduced costs, the optimization may be favorable with regard to the route(s). When the calculations predict increased costs or time, or provide unfavorable service class outcomes, the optimization may be unfavorable with regard to the route(s). In some embodiments, the cost saving calculations specifically focus on determining evaluation and time and mileage cost impacts resulting from the route optimization.

The route optimization may further include field review preparation, as performed by the processor 604 or similar components or systems. The field review preparation may include generation of reports presenting new material in an easy to understand manner.

The route optimization performed by the processor 604 and/or the system 600 may be measured based on a variety of factors. For example, a successfully optimized route results in a route that includes all of the service demands (delivery points) along that route and can be successfully traversed by the assigned carrier. Another success indicator may be whether or not the optimized route can be successfully digitized and displayed on mapping software and/or can provided automated turn-by-turn directions. A successfully optimized route may also be able to have an automated delivery point sequence generated for it. The successfully optimized routes may also be able to have calculated estimated mileage and travel times associated with the routes and calculated savings associated with the optimized routes as compared to non-optimized or previous routes (including, for example, mileage and/or carrier cost/salary changes). In some embodiments, the calculated savings are available before the route is optimized and/or implemented (for example, predictable without requiring implementation). The successfully optimized route may also be able to provide a summary comparison of route details (such as numbers of right/left turns, and so forth).

As one example, a route which indicated a digitized route of 53 miles can be evaluated and resequenced to a shorter route. The optimized, resequenced route was 45.1 miles, resulting in a 15% reduction. The reduction increases efficiency and savings, and improves carrier performance. For example, in an area in rural Virginia, there may be 38 routes which can be resequenced to reduce total mileage by 7%. This can result in 77 fewer miles driven each day for these 38 routes. Optimizing routes nationwide, assuming a 7% reduction, can reduce average mileage by over 214,000 miles per year, which can result in significant time, cost, fuel, energy, and other savings and efficiency improvements.

In some embodiments, the system 600 may include integration with or into an address management system for delivery points. Furthermore, the system 600 may be integrated with a maintenance selection system (for example, an RMSS). Furthermore, the system 600 may be implemented with or include a tracking system that identifies a status of a route, for example, whether the route is ready to be re-sequenced or whether there have been enough changes to the route to warrant reprocessing.

In some embodiments, the system 600 may be implemented as a platform that processes all GPS breadcrumbs and other inputs tracked by the delivery system 100. In some embodiments, the system 600 may be segmented to only handle a portion of the delivery system 100 (for example, a portion that relates to a particular geographic region or regions, such as cities or rural areas). For example, when the system 600 processes information for all rural routes of the delivery system 100, the system 600 may handle over 2,000,000,000 GPS breadcrumbs, over 5,000,000 scans from carrier MDDs, over 300,000 flats, and over 100,000 mailpieces daily (on average). This input data may be related to over 50,000,000 addresses that exist as potential delivery points in the rural routes. Furthermore, the compensation standards in place are used to determine costs for the routes that apply in the specified geographic region, for example, for the rural routes being handled by the system 600. The system 600 may also be connected to various other systems or databases to provide information that may be used in downstream processes. For example, the system 600 may be coupled to a road network system or database\to provide the road network information used in route determination, etc., and hourly work trackers (for example, rural work hour tracker, RWHT) and mail count volume inputs.

Based on these varied inputs, the system 600 may perform: (1) GPS stop identification (as described above) to determine what travel action(s) the carrier associated with the corresponding GPS breadcrumb may be experiencing or taking (for example, at a delivery point, driving between delivery points, at a railroad crossing, and so forth); (2) scan classification of the scans received from the carrier MDD to identify a delivery point action that the carrier is performing; (3) mail volume classification; and (4) address classification. Based on the identifications and classifications described above, the system 600 may further perform GPS stop clustering, GPS address matching, compensation evaluation, time and motion analysis, and perform route optimization preparation, as described above. The system 600 may generate various outputs based on the inputs received. For example, the system 600 may generate line of travel and frequent stops (based on, for example, a route model) and compensation evaluations along with the time and motion studies and route optimization demands, as described above). The system 600 may also generate various information for use in further analysis, including unit data, route data, interval data, stop data, and address data, as is further detailed in Table 2:

mileage reduction of between 5% and 10% or a reduced average time of 15 minutes, 30 minutes, 45 minutes, and so forth.

The optimized routes generated by the system 600 may include routes that have reduced mileage as compared to non-optimized routes. In some embodiments, the optimized routes may have reduced carrier time spent on other tasks or activities.

In some embodiments, the optimized route for a carrier may be compared to a nominal route for the carrier. In some embodiments, the nominal route may comprise a planned or

TABLE 2

| Unit | Route | Interval | Stop | Address |
|---|---|---|---|---|
| General | General | General | General | General |
| Area | Route Identifiers | third-party-Street | Stop Type | Stop Type |
| District | Vehicle Type | Name | (Mail, TCP, DDD) | ID/Address |
| Finance Number | Total Stops by Type | third-party-Lane Count | Subtype (Both AMS and TCP) | Location Data |
| Location Data | Location Data | third-party- | Address Names | Geocode |
| Geocode | Clustered Line of Travel | Average Historical Speed | Total Addresses | third-party |
| Fuel Stop | Daily Line of Travel | third-party-Surface Type | Location Data | Geocode |
| Geocode | Digital Turn by Turn Directions | Location Data | Clustered Stop | Historical |
| Mail Volume | Mail Volume | third-party-Street Geocodes | Geocode | Matched |
| Total Parcels | Route Parcels | Start | Daily Stop | Location |
| Total Accountable | Route Volume | Stop/Intersection | Geocode | Historical Scan |
| Mail | Route CR Flats | End | Scanner Device Data | Locations |
| Total Volume | Scanner Device Data | Stop/Intersection | Parcel to Mailbox | Scan Data |
| Total CR Flats | Activity Scan Compliance | GPS Distance | Parcel to Locker | Historical Scans (~2 years) |
| Scanner Device Data | Daily Scans | third-party Distance | Parcel to Door | Scan Types |
| Device Compliance Scores | Device Blackouts | Skipped Stops | Accountable Mail | Scan Location |
| Time Data | Daily Walk/Drive | Total stops on interval | Carrier Pickup Items and | Outliers |
| Total Street Time | Time Data | Stop locations along interval | Events OOR | Compliance Scores |
| Total Office Time | GPS Street and Office | Scanner Device Data | Walk/Drive Distance and | |
| Evaluations | Load Vehicle Duration | Scan Activity During Interval | Location Time Data | |
| Total Unit Cost | Break/Lunch Duration | Time Data | Clustered Stop Average | |
| Total Walk/Drive | Evaluations | Interval Duration | Duration | |
| | Daily Compensation Evaluation | Interval Speed Evaluations | Clustered Stop Frequency | |
| | Basic Service Time | Evaluated Demand by Traversal | Matched Stop Duration | |
| | Basic Drive Time | | Stop Start/End Time | |
| | Basic Walk Time | | Total Office Time Evaluations | |
| | Basic TCP Time | | Evaluation System Engineered Matched Stop Duration | |

In some embodiments, system 600 may be configured automatically to generate one or more reports that can identify pending actions (actions waited on) before a route is verified or that the route is verified. In some embodiments, the reports can also include various details regarding the route, including turn by turn directions, associated costs, and so forth. In some embodiments, reports that identify savings provided by routes (for example, annualized, etc.) may be generated. In some embodiments, the reports may correlate the optimized route details with the previous, or non-optimized route details (for example, including digital versus current paid miles, route identifier, and so forth). In some embodiments, the optimized route may provide an average scheduled static or dynamic route for the carrier, for example as previously generated when the route was originally created or from previous updates to the route. In some embodiments, a nominal route can be generated once a year, every six months, or at any other desired periodicity, and can use route data from previous route performances, the average of previous performances, and the like. Thus, the nominal route may include all expected office duties expected of the carrier as well as all street aspects of the route, which may include delivery points, traffic occurrences, and details of travel segments between delivery points. Each optimized route may have a corresponding nominal route. Once the optimized route is generated, as generated above, the delivery system 100 may compare the optimized route and the nominal route to identify distinctions or differences between the routes and identify an efficiency gained by the optimized route. The efficiency gained may be measured as a number of minutes gained in a workday for the carrier (for example, where the optimized route allows the carrier to end the optimized route earlier, for example, in less time, as measured by a number of minutes or a percentage difference in total time) than the nominal route, a number of miles reduced as compared to the nominal route (for example, where the optimized route is shorter in distance than the nominal route by a number of miles or by a given percentage of total distance), involves fewer items for delivery, and so forth. In some embodiments, when the efficiency gained exceeds a particular threshold (for example, the optimized route ends in less time, involves a shorter traveled distance, and so forth), then the delivery system 100 may flag the optimized route as one to be appended with additional delivery points, to be merged with another route, and/or to be split and merged with another route. As such, the optimizing of routes may result in a reduced number of total routes where the optimized routes may be consolidated into a fewer number of routes as compared to the nominal routes.

In some embodiments, part of generating the optimized routes comprises verifying that the optimized routes include relevant portions of the corresponding nominal routes. In some embodiments, the delivery system, the carrier, and/or another delivery resource may review the optimized routes and the corresponding nominal routes to identify the differences between the routes and to confirm that the optimized route includes and/or accounts for all relevant aspects of the nominal route. In some embodiments, the delivery system and/or the carrier may identify deltas between specific portions of the routes, for example the office portions. When these deltas exceeds a particular threshold, the delivery system and/or the carrier may determine additional activities that the carrier may perform (for example, additional activities that could be added to the optimized route) due to the increased efficiency of the optimized routes. In some embodiments, the delivery system 100 may calculate a score for the optimized route based on the compared efficiencies, standards, and so forth. In some embodiments, the score may correspond to how similar the optimized route is to the corresponding nominal route and/or the efficiency or other gains provided by the optimized route over the corresponding nominal route. In some embodiments, the score may correspond to both the similarity of the routes as well as the improvement in efficiency, and so forth.

Figure 8:
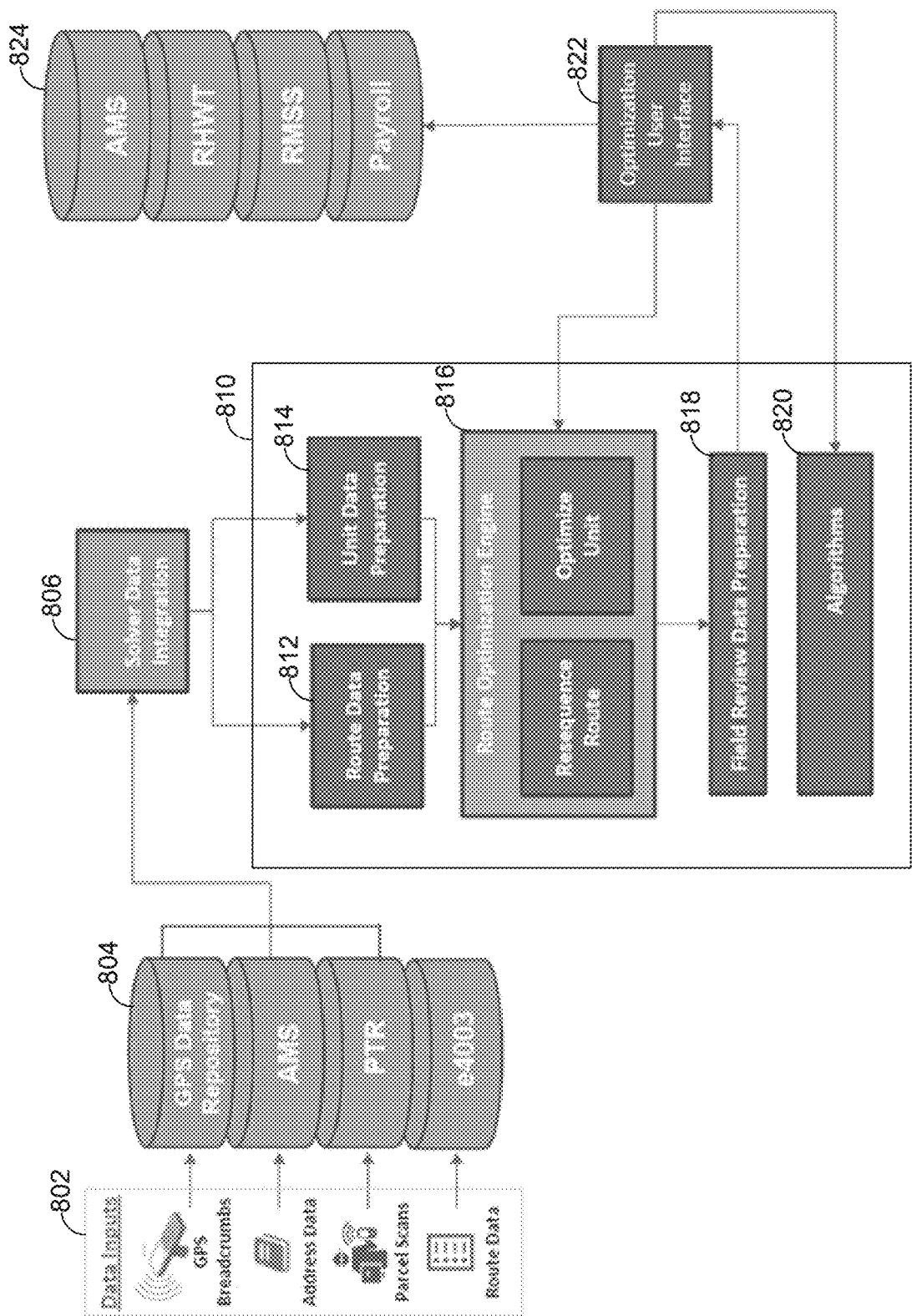
FIG. 8 shows an example dataflow of how the delivery system may process input data using a route optimization component to generate optimization information for one or more routes.

FIG. 8 shows an example dataflow 800 of how the delivery system 100 may process input data 802 using a route optimization component 810 to generate optimization information for one or more routes. The input data 802 may be received in real-time or from a datastore, such as from one of the datastores 804. For example, GPS breadcrumb data may be received from a GPS unit in the MDD or the delivery vehicle 110 or from a GPS data repository, while address data may be received from the AMS, parcel scans may be received from a parcel scan data repository (PTR), and route data may be received from a route data datastore (e4003). A PTR database may comprise a database that stores outputs, such as item scans or other scans from a mobile delivery device. The input data 802 may detail route activity, including street activity as mapped to a road network. The delivery system 100, for example, via the processor 605, may employ the optimization component 810 to perform route resequencing and optimization based on the inputs 802. In some instances, the optimization information generated by the optimization component 810 may be presented to a user via a user interface 822. In some instances, the optimization component 810 may perform the route standardization and time determination described above and with respect to FIG. 9 below.

The optimization component may receive the data inputs 802 and process them for route data preparation and unit data preparation at blocks 812 and 814. The optimization engine 816 may process the prepared route and unit data to generate route resequencing and optimization information, including standardizing routes and developing route information based thereon. The optimization engine 816 may analyze the data inputs 802 and generate the standardization information for different aspects of the route. For example, the optimization engine 816 can analyze one or more routes to populate the drive speed matrix (DSM). For example, the optimization engine 816 may identify an average speed driven by the delivery vehicle 110 for different distances between stops. Table 3 provides an example DSM as populated by the optimization engine 816 and the delivery system 100 based on an analysis of the routes of the delivery system 100.

TABLE 3

Allowances = 6.64%

| Distance Range (ft) | Average Drive Speed (mph) | Interval Count | Standard Speed (mph) | Standard Speed (min/foot) |
|---|---|---|---|---|
| 0 ft-15 ft | 4.88 | 226,294 | 4.57 | 0.00249 |
| 15 ft-20 ft | 6.86 | 125,592 | 6.44 | 0.00176 |
| 20 ft-30 ft | 6.86 | 419,942 | 6.43 | 0.00177 |
| 30 ft-45 ft | 7.22 | 1,041,723 | 6.77 | 0.00168 |
| 45 ft-65 ft | 7.91 | 1,914,781 | 7.42 | 0.00153 |
| 65 ft-90 ft | 8.59 | 2,815,863 | 8.05 | 0.00141 |
| 90 ft-120 ft | 9.45 | 2,780,714 | 8.86 | 0.00128 |
| 120 ft-155 ft | 10.44 | 2,511,404 | 9.79 | 0.00116 |
| 155 ft-195 ft | 11.49 | 1,925,790 | 10.77 | 0.00106 |
| 195 ft-240 ft | 12.58 | 1,562,369 | 11.79 | 0.00096 |
| 240 ft-290 ft | 13.73 | 1,257,636 | 12.87 | 0.00088 |
| 290 ft-345 ft | 14.83 | 1,026,097 | 13.91 | 0.00082 |
| 345 ft-405 ft | 15.88 | 822,435 | 14.89 | 0.00076 |
| 405 ft-470 ft | 16.99 | 667,894 | 15.93 | 0.00071 |
| 470 ft-540 ft | 18.13 | 552,877 | 17.00 | 0.00067 |
| 540 ft-615 ft | 19.20 | 482,948 | 18.01 | 0.00063 |
| 615 ft-695 ft | 20.23 | 415,296 | 18.97 | 0.00060 |
| 695 ft-780 ft | 21.25 | 348,240 | 19.93 | 0.00057 |
| 780 ft-870 ft | 22.28 | 304,968 | 20.89 | 0.00054 |
| 870 ft-965 ft | 23.22 | 271,812 | 21.78 | 0.00052 |
| 965 ft-1065 ft | 24.21 | 229,789 | 22.70 | 0.00050 |
| 1065 ft-1170 ft | 25.08 | 207,351 | 23.52 | 0.00048 |
| 1170 ft-1280 ft | 26.09 | 199,355 | 24.47 | 0.00046 |
| 1280 ft-1395 ft | 26.91 | 183,003 | 25.24 | 0.00045 |
| 1395 ft-1515 ft | 27.59 | 159,144 | 25.87 | 0.00044 |
| 1515 ft-1640 ft | 28.49 | 142,107 | 26.72 | 0.00043 |
| 1640 ft-1770 ft | 29.43 | 118,288 | 27.60 | 0.00041 |
| 1770 ft-1905 ft | 30.16 | 108,322 | 28.29 | 0.00040 |
| 1905 ft-2045 ft | 30.93 | 97,222 | 29.00 | 0.00039 |
| 2045 ft-2190 ft | 31.55 | 85,040 | 29.58 | 0.00038 |
| 2190 ft-2340 ft | 31.74 | 79,077 | 29.76 | 0.00038 |
| 2340 ft-2495 ft | 32.78 | 67,752 | 30.74 | 0.00037 |
| 2495 ft-2665 ft | 33.50 | 82,721 | 31.41 | 0.00036 |
| 2665 ft-2820 ft | 33.76 | 55,888 | 31.66 | 0.00036 |
| 2820 ft-2990 ft | 34.35 | 52,092 | 32.22 | 0.00035 |
| 2990 ft-3165 ft | 34.65 | 44,747 | 32.49 | 0.00035 |
| 3165 ft-3345 ft | 35.22 | 39,953 | 33.03 | 0.00034 |
| 3345 ft-3530 ft | 36.16 | 35,039 | 33.91 | 0.00034 |
| 3530 ft-3720 ft | 36.39 | 34,041 | 34.13 | 0.00033 |
| 3720 ft-3915 ft | 36.69 | 27,739 | 34.41 | 0.00033 |
| 3915 ft-4115 ft | 37.40 | 28,849 | 35.07 | 0.00032 |
| 4115 ft-4320 ft | 37.69 | 22,565 | 35.35 | 0.00032 |
| 4320 ft-4530 ft | 38.28 | 20,246 | 35.90 | 0.00032 |
| 4530 ft-4745 ft | 38.27 | 15,910 | 35.88 | 0.00032 |
| 4745 ft-4965 ft | 38.17 | 17,597 | 35.80 | 0.00032 |

TABLE 3-continued

Allowances = 6.64%

| Distance Range (ft) | Average Drive Speed (mph) | Interval Count | Standard Speed (mph) | Standard Speed (min/foot) |
|---|---|---|---|---|
| 4965 ft-5190 ft | 39.61 | 17,891 | 37.15 | 0.00031 |
| >5190 ft | 42.07 | 137,872 | 39.45 | 0.00029 |

Table 3 shows the average speed at which the delivery vehicle 110 travels for each distance between stops on the route, where the stops correspond to delivery point stops or stops for TCPs and the like. For each distance range, the interval count of the DSM can be a number of times that distance range exists in one particular route, or in all of the routes of the delivery system 100 associated with the same facility, in the same geographical area or region, etc. Table 3 also shows standard speeds in miles per hour (mph) and minutes per foot (min/foot), which represent the standard speed used for any segments between stops that fall within the defined range.

In some instances, the delivery system 100 may employ one or more data analysis techniques that process the GPS breadcrumbs and information received from the carriers and similar entities to identify the values of and populate the DSM. In some instances, the one or more data analysis techniques include one or more algorithms, details on GPS breadcrumbs, stop information, and the like to populate the DSM and identify characteristics of the route. In some embodiments, the GPS breadcrumb data may be filtered according to one or more values, including based on information about the route, based on details of the algorithm, details of the GPS breadcrumbs, stop information, GPS information, and so forth.

As described herein, the delivery system 100, for example, via the optimization engine 816, may determine the time that it ideally or on average, should take the delivery vehicle 110 to travel between each of the stops of its route, for example by aggregating the times for the segments between each stop of the route as determined based on the DSM of Table 3. However, this alone does not account for the times spent at each of the stops, where the stops can be the delivery point stops or TCP stops. For example, for each of the actions identified in Table 4 below, which includes some activity information from Table 1:

TABLE 4

| Standard Number | Standard Description | Standard Minutes | Units (min per) | Location |
|---|---|---|---|---|
| S001 | Scanner setup activities | 0.1882 | Day | Office |
| S002 | Office walking speed | 0.00429 | Foot | Office |
| S003 | Gather random mail | 1.0517 | Day | Office |
| S004 | Case random letters | 0.0647 | Piece | Office |
| S005 | Case random flats | 0.0862 | Piece | Office |
| S006 | Case Carrier Route flats | 0.0741 | Piece | Office |
| S007 | Gather DPS letters | 0.2500 | Tray | Office |
| S008 | Locate and access DPS letter trays | 0.7689 | Day | Office |
| S009 | Case DPS letters | 0.0294 | Piece | Office |
| S010 | Case WSS flats | 0.0741 | Piece | Office |
| S011 | Case WSS letters | 0.0364 | Piece | Office |
| S012 | Case Boxholder flats | 0.0646 | Piece | Office |
| S013 | Case Boxholder letters | 0.0303 | Piece | Office |
| S014 | Gather DPS flats | 0.2050 | Tray | Office |
| S015 | Locate and access DPS flat trays | 0.1653 | Day | Office |
| S016 | Case DPS flats | 0.0708 | Piece | Office |
| S017A | Pull down handle trays | 0.2458 | Tray | Office |
| S017B1 | Pull down handful | 0.0291 | Handful | Office |
| S017B2 | Pull down compartments | 0.0588 | Reach | Office |
| S017C | Position and remove rubber bands | 0.0990 | Rubr Bnd | Office |
| S018A | Gather parcels first cart | 0.1774 | 1st Cart | Office |
| S018B | Gather parcels additional cart | 0.4944 | Addl Cart | Office |
| S019 | Organize large parcels | 0.5157 | Piece | Office |
| S020 | Organize small and medium parcels | 0.2367 | Piece | Office |
| S021 | Process accountable mail, signature items | 1.4745 | Piece | Office |
| S022 | Process customs due | 1.4745 | Piece | Office |
| S023 | Process COD | 1.4745 | Piece | Office |
| S024 | Process postage due | 0.0345 | Piece | Office |
| S025 | Perform fixed accountable cage activities | 0.7418 | Day | Office |
| S026 | Process carrier pick-up event forms | 0.1140 | Form | Office |
| S027 | Process markups | 0.4233 | Bundle | Office |
| S028 | Process change-of-address forms* | Retired | | |
| S029 | Process PARS label (Form 3982) | 0.4050 | Piece | Office |
| S030 | Complete trip report (Form 4240) | 0.4910 | Day | Office |
| S031 | Move trays to storage | 0.2643 | Day | Office |
| S032 | Inspect Government vehicle | 1.8716 | Day | Office |
| S033 | Driving speed (mail stop to DDD stop) | DSM | Foot | Street |
| S034 | Walking speed (DDD stop to door) | 0.00429 | Foot | Street |
| S035 | Deliver parcels to door | 0.1954 | Piece | Street |
| S036 | Deliver parcels to mailbox | 0.1671 | Piece | Street |
| S037 | Deliver parcels to parcel locker | 0.3589 | Piece | Street |
| S038 | Deliver accountable mail, signature items | 0.9615 | Piece | Street |
| S039 | Deliver customs due | 1.6618 | Piece | Street |
| S040 | Deliver COD | 1.6618 | Piece | Street |
| S041 | Collect postage due | 0.9127 | Piece | Street |
| S042 | Collect registered/certified mail | 0.0944 | Piece | Street |
| S043 | Collect money order applications | 2.1799 | Piece | Street |

TABLE 4-continued

| Standard Number | Standard Description | Standard Minutes | Units (min per) | Location |
|---|---|---|---|---|
| S044 | Accept ord, cod, ins parcels | 0.1034 | Piece | Street |
| S045 | Carrier pickup & prepaid event | 1.1817 | Event | Street |
| S046 | Carrier pickup & prepaid items | 0.1592 | Piece | Street |
| S047 | Prelim & concluding at vehicle for trip to door | 0.8520 | Event | Street |
| S048F | Gather accountable mail/large parcel fixed | 0.2050 | Trip | Street |
| S048V | Gather accountable mail/large parcel variable | 0.0812 | Piece | Street |
| S049 | Service (blue box) collection points | 1.7928 | Box | Street |
| S050 | Service inter-unit mail (low volume) | 1.4787 | Unit | Street |
| S051 | Service inter-unit mail (high volume) | 5.7659 | Unit | Street |
| S052 | Fuel vehicle | 3.1421 | Refuel | Street |
| S053 | Retrieve first mail tray behind bulkhead | 0.7167 | Tray | Street |
| S054 | Retrieve additional mail trays behind bulkhead | 0.1785 | Tray | Street |
| S055 | Retrieve first mail tray under platform | 1.4558 | Tray | Street |
| S056 | Retrieve additional mail trays under platform | 0.1239 | Tray | Street |
| S057 | Retrieve first mail tray rear door | 1.8073 | Tray | Street |
| S058 | Retrieve additional mail trays rear door | 0.2221 | Tray | Street |
| S059 | Retrieve first med parcels tub behind bulkhead | 0.7579 | Tray | Street |
| S060 | Retrieve addl med parcels tubs behind bulkhead | 0.2006 | Tray | Street |
| S061 | Retrieve first med parcels tub rear door | 1.2540 | Tray | Street |
| S062 | Retrieve addl med parcels tubs rear door | 0.2221 | Tray | Street |
| S063 | Move large parcels from cargo area to rear door | 0.1895 | Piece | Street |
| S064 | Move addl large parcels cargo area to rear door | Retired | | |
| S065 | Perform simple one-step scans | 0.0795 | Scan | Offc/Strt |
| S066 | Perform prompted two-step scans | 0.0928 | Scan | Offc/Strt |
| S067 | Contact Rural Reach customers | 5.2458 | Contact | Street |
| S068 | Sell stamp stock | 0.7140 | Sale | Street |
| S069 | Deliver miscellaneous to door | 0.0854 | Trip | Street |
| S070 | Full scan | 0.1011 | Scan | Street |
| S071 | Partial scan | 0.0223 | Scan | Street |
| S100 | Box time CURB (one-bundle) | 0.1483 | Box | Street |
| S101 | Box time CURB (two-bundle) | 0.2027 | Box | Street |
| S102 | Box time CURB (three-bundle) | 0.2572 | Box | Street |
| S103 | Dismount and prep SDWK | 0.6709 | Stop | Street |
| S103A | Additional trip SDWK | 0.1544 | Trip | Street |
| S104 | Box time SDWK (one-bundle) | 0.1356 | Box | Street |
| S105 | Box time SDWK (two-bundle) | 0.1900 | Box | Street |
| S106 | Box time SDWK (three-bundle) | 0.2445 | Box | Street |
| S107 | Dismount and prep OTHER | 0.8931 | Stop | Street |
| S107A | Additional trip OTHER | 0.2076 | Trip | Street |
| S108 | Box time OTHER (one-bundle) | 0.1346 | Box | Street |
| S109 | Box time OTHER (two-bundle) | 0.1890 | Box | Street |
| S110 | Box time OTHER (three-bundle) | 0.2434 | Box | Street |
| S111 | Dismount and prep CBU | 0.8816 | Stop | Street |
| S111A | Additional trip CBU | 0.1544 | Trip | Street |
| S112 | Unit time CBU | 0.3311 | Unit | Street |
| S113 | Box time CBU (one-bundle) | 0.0528 | Box | Street |
| S114 | Box time CBU (two-bundle) | 0.1077 | Box | Street |
| S115 | Box time CBU (three-bundle) | 0.1625 | Box | Street |
| S116 | Collection box CBU | 0.0558 | Coll Box | Street |
| S117 | Dismount and prep CENT | 1.9112 | Stop | Street |
| S117A | Additional trip CENT | 0.4409 | Trip | Street |
| S118 | Unit time CENT | 0.3803 | Unit | Street |
| S119 | Box time CENT (one-bundle) | 0.0528 | Box | Street |
| S120 | Box time CENT (two-bundle) | 0.1077 | Box | Street |
| S121 | Box time CENT (three-bundle) | 0.1625 | Box | Street |
| S122 | Collection box CENT | 0.0558 | Coll Box | Street |
| S123 | Dismount and prep (NPU) | 1.9112 | Stop | Street |
| S123A | Additional trip NPU | 0.4409 | Trip | Street |
| S124 | Unit time NPU | 0.0983 | Unit | Street |
| S125 | Box time NPU (one-bundle) | 0.0528 | Box | Street |
| S126 | Box time NPU (two-bundle) | 0.1077 | Box | Street |
| S127 | Box time NPU (three-bundle) | 0.1625 | Box | Street |
| S128 | Collection box NPU | 0.0558 | Coll Box | Street |
| S129 | Dismount and prep DET | 2.0761 | Stop | Street |
| S129A | Additional trip DET | 0.4958 | Trip | Street |
| S130 | Unit time DET | 0.0983 | Unit | Street |
| S131 | Insert mail in customer assigned boxes DET | 0.2084 | Box | Street |
| S132 | Collection box DET | 0.0558 | Coll Box | Street |
| S133 | Presort mail for insertion in boxes DET | 0.1256 | Unit | Street |
| S134 | Stop sign | 0.0499 | Stop TCP | Street |
| S135 | Yield sign | 0.0159 | Yield TCP | Street |
| S136 | Traffic light | 0.2051 | TL TCP | Street |
| S137 | School cross walk | 0.0092 | SCW TCP | Street |
| S138 | Railroad crossing | 0.0165 | RRC TCP | Street |
| S139 | Draw bridge | Retired | | |
| S140 | Access gate | 0.1805 | AG TCP | Street |
| S141 | Toll Road | Retired | | |

TABLE 4-continued

| Standard Number | Standard Description | Standard Minutes | Units (min per) | Location |
|---|---|---|---|---|
| S142 | Walking standard | 0.00429 | Foot | Street |
| S143 | Creep Time | 0.0208 | Space | Street |
| S144 | Verify letter addresses | 0.0116 | Piece | Street |
| S145 | Verify flat addresses | 0.0142 | Piece | Street |

As shown in Table 4, for the listed activities, a standard amount of time is allocated (along with details regarding units and location of the activity) based on historical data gathered from prior activity, breadcrumb data, AMS and PTR data, correction factors, etc. Each stop and feature of the route can be categorized into one of the categories of Table 4. For example, the optimization engine 618 or other component of the system can identify features of the route, which can include the stops and the time/distance/activity between each identified stop. The stops and the segments between stops are categorized in one of the categories in Table 4, and a time for each stop and segment between stops is determined. By summing all the stops and segments, a time for the route can be determined. In some embodiments, a segment may be the portion between stops or it may include a stop at one or both ends.

The time (i.e., standard minutes) for each activity in Table 4 that a delivery resource performs or completes can be used by the optimization engine 618 to determine how long each of a delivery resource's activities takes when servicing the route. Where a delivery resource performs the same activity more than once, the route may have multiple entries with the same standard number. The optimization engine 618 can compare the delivery resource's times and to the standard times. This information, in combination with driving times for the delivery vehicle 110 while traveling the route (i.e., the aggregation of the times for traveling between stops where the activities are performed) can identify the time for the route. This time may be a total amount of time that passes while the carrier performs the various activities and drives between the corresponding stops to complete the route.

The delivery system 100 can use the calculations described above to estimate an amount of time that carriers will spend completing corresponding routes. However, events may introduce delays while the carrier is serving the route. While such delays may be random, average effects (for example, estimates of the durations of such delays) can be estimated based on tracked information from the GPS breadcrumbs and input from the carriers an corresponding entities. Such estimates can be applied to all routes, effectively adding an amount of time to all routes. Based on these calculations and integration of the delay estimates, the delivery system 100 can generate accurate estimates for durations of delivery routes with reduced and simplified calculations.

As shown in FIG. 8, the optimization component 810 may provide optimized route information to the user interface 822 and may receive confirmation or rejection of one or more of the generated route information (for example, estimated route times, proposed route representations, proposed optimizations, and the like). In some instances, the processed data of the optimization engine 816 is prepared for presentation to the carrier or similar entity for review and confirmation. In some instances, the optimization component 810 may apply one or more algorithms 820 to the data generated by the optimization engine 816, for example, based on input received from the carrier or entity via the user interface 822. For example, when the delivery resource or the carrier confirms that the information for the route (for example, the digital representation of the route or the information generated about the route) or makes changes to the information, the optimization component 810 may use the changed information to revise the digital route information and/or provide additional information. The user interface 822 may enable the carrier or other entity to input data for the route and/or confirm information generated by the optimization component 810 before such information is output at 824. For example, when a digital route is created, the system may provide the digital route to the delivery resource. The delivery resource may adjust or change the digital route if there are errors noted in the digital route, or if there is an anomaly of some kind in the digital data and route. Any adjustments made can be input into the optimization component 810 to be reflected in an updated digital route. After any adjustments, the route is outputted and stored in datastores 824.

Figure 9:
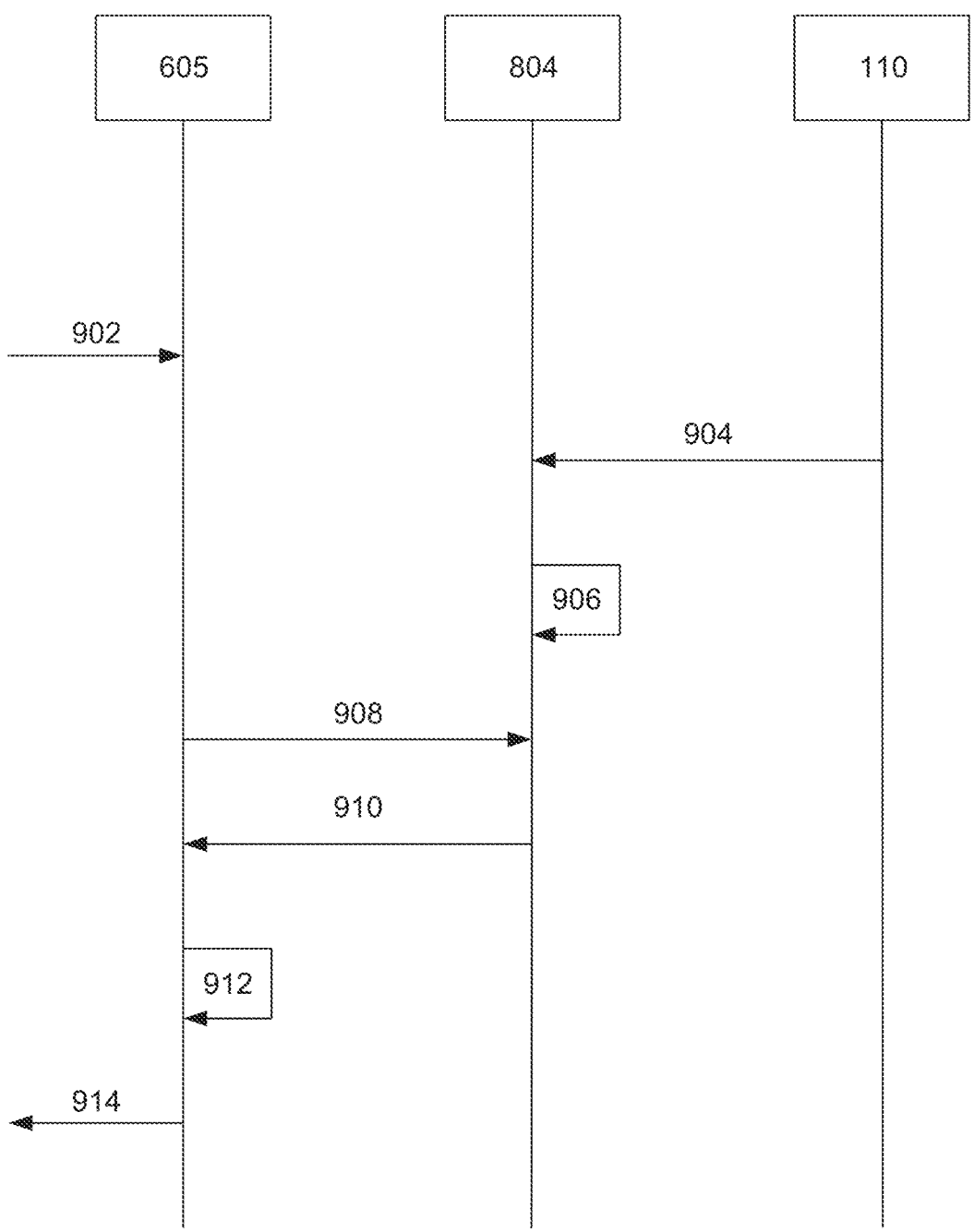
FIG. 9 shows a data flow diagram for a GPS and route processing system for processing data to generate route timing information.

FIG. 9 shows a data flow diagram 900 for a delivery system 100 (for example, the optimization component 810 of the route management component 205) processes the input data 802 comprising GPS and route information to generate route timing information. The data flow diagram 900 depicts, in more detail that described above, how the delivery system 100 generates information for how long it takes a carrier to service its route.

When the delivery system 100 is identifying the route service time, the delivery system 100 may receive a request for generating the route service time, for example, request 902, received by the processor 605 of the delivery system 100. This request may be received via the user interface 822, which may correspond to the user interface 622, or another communication interface device. The request 902 may include identification of a particular route, which may include a unique combination of stops, activities, and driving segments as compared to other routes. The request 902 may occur or be received simultaneously with, after, or before route data for the identified route is received from the delivery vehicle 110 and/or carrier (for example, GPS breadcrumb data and/or information about stops or TCPs along the corresponding route). This data is shown in the data flow 900 as information 904 from the delivery vehicle 110 to the data stores 804. In some instances, the data in the data stores 804 (for example, the breadcrumb data and/or other data relating to the route) can be processed at 906. Such processing may comprise analyzing GPS breadcrumb data from one or more carriers and delivery vehicles 110 to identify drive speed times and populate the DSM and identify TCPs and other stops or activities and corresponding standard times for completing the activities and driving the distances between stops. For example, the processing 906 may correspond to generation and population of the data in Tables 2 and 3 as it pertains to the route for which the route service time is requested. In some instances, while the processing is shown at the data store 804, the processing may be performed by the processor 605 in conjunction with conveying the data from the data store 804 (and/or the delivery vehicle 110) to the processor 605 and storing the results (for example, the populated Tables 2 and 3) to the data store 804.

The processor 605 may request information for the route from the data store 804 based on the received request 902. For example, the processor 605 may request stop and drive segment information for the route identified in the request 902 at 908. Additionally, the processor 605 may request the DSM and activity standard information (for example, the information in example Tables 2 and 3). The processor 605 may receive this information from the data store 804 at 910. Then, at 912, the processor 605 may use the information received for the route and the standard DSM and activity information to identify and calculate how long it takes for the carrier to complete the activities for the identified delivery route. At 914, the processor 605 outputs the generated delivery time for the identified route, for example via the user interface 822.

The processor 605 can generate a digital route based on the standards, the DSM, etc. The digital route can include stops, TCPs, turns, time spent at each stop, and the like. The digital route can be compared to the actual breadcrumb data received from the MDD and/or vehicle of the carrier. Any inefficiencies, errors, or events that exceed a standard time can be flagged, highlighted, and addressed. In some embodiments, after a digital route is created, the digital route is provided to a delivery resource, such as a supervisor, carrier, third party database, or other data source to identify any errors in the digital route. For example, the digital route may indicate that a certain route should be followed, but the delivery resource knows that the digital route indicates travel the wrong way on a 1-way street. Or, the digital route provides a certain time to deliver a parcel at a delivery point corresponding to a front door. However, the delivery resource may know of a customer's preference to have parcels delivered to another location, such as a side door, garage door, in a container, etc.

These inconsistencies between the digital route and the actual route can be reviewed by the delivery resource via the user interface, and the delivery resource can identify reasons and correct an inaccuracy in the digital route. In some embodiments, the delivery resource can flag inconsistencies, and an alert can be generated and sent to a supervisor, or an automatic program can analyze the inconsistencies and make a determination on reconciling the inconsistency. When the reconciled digital route is completed, the reconciled digital routes can be used to optimize routes, as described herein.

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method of generating a digital representation of a delivery route, the method comprising:
   receiving, via a user interface, a request to generate the digital representation of a static delivery route;
   receiving, by a processor, in response to the request, location data for a delivery resource that has completed travelling the static delivery route, the location data comprising global positioning system (GPS) breadcrumb data received from a mobile computing device while the delivery resource traversed the static delivery route;
   identifying, by a processor, stops along the static delivery route in the location data;
   determining, by a processor, whether the identified stops comprise delivery points or traffic control points along the static delivery route;
   generating the digital representation of the static delivery route based on the identified stops and the GPS breadcrumb data;
   identifying one or more features of the static delivery route, wherein each of the one or more features of the static delivery route comprises one or more corresponding characteristics associated therewith, the one or more characteristics comprising a duration of travel between pairs of consecutive delivery point stops, distance traveled between the pairs of consecutive delivery point stops, and an average speed of the delivery resource when traveling between the pairs of consecutive delivery point stops;
   after completion of the static delivery route, receiving identification of the one or more characteristics from the delivery resource via the user interface;
   analyzing the breadcrumb data with one or more algorithms to identify delivery point stops along the static delivery route;
   receiving identification of traffic control points from the delivery resource via the user interface;
   determining whether each of the one or more features of the static delivery route is an office activity or a street activity;
   categorizing the one or more features of the static delivery route into one or more categories based on the characteristics of the one or more features, wherein each category of the one or more categories has a particular combination of characteristics and a corresponding time period associated therewith; and
   determining a duration of the static delivery route based on the corresponding time periods associated with each of the one or more categories for the one or more features of the static delivery route.

2. The method of claim 1, wherein identifying stops along the static delivery route comprises determining that a stop exists at a particular location based on a quantity of breadcrumb data at or within a threshold distance of the particular location.

3. The method of claim 1, wherein identifying stops along the static delivery route comprises determining that a stop exists at a particular location based on identification of the stop by the delivery resource via a user interface.

4. The method of claim 1, wherein the one or more corresponding characteristics comprise a duration of travel between pairs of consecutive delivery point stops, distance traveled between the pairs of consecutive delivery point stops, and an average speed of the delivery resource when traveling between the pairs of consecutive delivery point stops.

5. The method of claim 1, wherein identifying one or more features of the static delivery route comprises analyzing the breadcrumb data with one or more algorithms to identify traffic control points along the static delivery route.

6. The method of claim 1, further comprising determining a standard time for each of the categories based on historical breadcrumb data from a plurality of delivery resources and a plurality of routes for a predetermined time.

7. The method of claim 1, wherein identifying the one or more features of the static delivery route further comprises identifying segments of the routes which occur between the identified stops.

8. A system of managing delivery routes, the system comprising:
via a user interface configured to generate a request for a digital representation of the static delivery route;
a location circuit configured to generate breadcrumb data as a delivery resource traverses a delivery route;
a processor configured to:
receive, from the location circuit, the breadcrumb data for the entire delivery route generated as the delivery resource traversed the route;
identify a plurality of stops in the breadcrumb data;
determine whether each of the plurality of identified stops comprises a delivery points or a traffic control point;
generate the digital representation of the static delivery route based on the identified stops and the breadcrumb data;
identify one or more features of the static delivery route, wherein each of the one or more features of the static delivery route comprises one or more corresponding characteristics associated therewith, the one or more corresponding characteristics comprising a duration of travel between pairs of consecutive delivery point stops, distance traveled between the pairs of consecutive delivery point stops, and an average speed of the delivery resource when traveling between the pairs of consecutive delivery point stops;
determine whether each of the one or more features is an office activity or a street activity;
after the delivery resource has completed the static delivery route, receive identification of the one or more characteristics from the delivery resource via the user interface;
analyze the breadcrumb data with one or more algorithms to identify delivery point stops along the static delivery route;
receive identification of traffic control points from the delivery resource via a user interface;
categorize the one or more features of the static delivery route into one or more categories based on the characteristics of the one or more features, wherein each category of the one or more categories has a particular combination of characteristics and a corresponding time period associated therewith; and
determine a duration of the static delivery route based on the corresponding time periods associated with each of the one or more categories for the one or more features of the static delivery route.

9. The system of claim 8, wherein the processor is further configured to determine that a stop exists at a particular location based on a quantity of breadcrumb data at or within a threshold distance of the particular location.

10. The system of claim 8, wherein the processor is configured to identify stops along the static delivery route by determining that a stop exists at a particular location based on identification of the stop by the delivery resource via a user interface.

11. The system of claim 8, wherein the processor is configured to identify the one or more features of the static delivery route by analyzing the breadcrumb data with one or more algorithms to identify traffic control points along the static delivery route.

12. The system of claim 8, wherein the processor is further configured to determine a standard time for each of the categories based on historical breadcrumb data from a plurality of delivery resources and a plurality of routes for a predetermined time.

13. The system of claim 8, wherein the processor is further configured to identify the one or more features of the static delivery route by identifying segments of the routes which occur between the identified stops.

14. The method of claim 1, wherein the one or more features of the static delivery route are specific tasks performed by the delivery resource, and wherein the corresponding time period is a set time duration assigned for each of the one or more features of the static delivery route.

15. The system of claim 8, wherein the one or more processors are further configured to determine whether each of the one or more features is an office activity or a street activity.

16. The system of claim 8, wherein the one or more features of the static delivery route are specific tasks performed by the delivery resource, and wherein the corresponding time period is a set time duration assigned for each of the one or more features of the static delivery route.

* * * * *